United States Patent
Atawia et al.

(10) Patent No.: US 12,185,353 B2
(45) Date of Patent: Dec. 31, 2024

(54) QUALITY OF SERVICE DRIVEN SPECTRUM SHARING

(71) Applicant: Telefonaktiebolaget LM Ericsson (publ), Stockholm (SE)

(72) Inventors: Ramy Atawia, Kanata (CA); Karl Mann, Ottawa (CA); Geoffrey McHardy, Carp (CA); Michael D. Russell, Nepean (CA); ZhongMing Zheng, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 352 days.

(21) Appl. No.: 17/629,912

(22) PCT Filed: Jul. 31, 2020

(86) PCT No.: PCT/IB2020/057289
§ 371 (c)(1),
(2) Date: Jan. 25, 2022

(87) PCT Pub. No.: WO2021/019517
PCT Pub. Date: Feb. 4, 2021

(65) Prior Publication Data
US 2022/0256551 A1    Aug. 11, 2022

Related U.S. Application Data

(60) Provisional application No. 62/881,030, filed on Jul. 31, 2019.

(51) Int. Cl.
*H04W 72/543* (2023.01)
*H04W 16/14* (2009.01)
*H04W 72/12* (2023.01)

(52) U.S. Cl.
CPC ........ *H04W 72/543* (2023.01); *H04W 16/14* (2013.01); *H04W 72/1215* (2013.01)

(58) Field of Classification Search
CPC ............ H04W 16/14; H04W 72/1215; H04W 72/543; H04W 72/566; H04L 41/0681
See application file for complete search history.

(56) References Cited

U.S. PATENT DOCUMENTS

| 7,869,400 B2 | 1/2011 | Hu et al. |
| 8,503,383 B2 | 8/2013 | Hu et al. |

(Continued)

FOREIGN PATENT DOCUMENTS

EP    2186232 B1    8/2018

OTHER PUBLICATIONS

Indian Examination Report dated Jul. 4, 2022 issued in corresponding Indian Application No. 202247009898, consisting of 6 pages.

(Continued)

*Primary Examiner* — Gary Mu
(74) *Attorney, Agent, or Firm* — Ericsson Inc.

(57) ABSTRACT

A network node and a method for a network node to allocate wireless resources among a plurality of radio access technologies, RATs, are provided. The method includes determining a quality requirement based at least on a historical wireless resource allocation and allocating wireless resources among the plurality of 5 RATs based at least on the determined quality requirement. A controller and a method for the controller are also provided.

22 Claims, 10 Drawing Sheets

(56) References Cited

U.S. PATENT DOCUMENTS

| | | | |
|---|---|---|---|
| 2009/0059856 A1 | 3/2009 | Kermoal et al. | |
| 2013/0029635 A1* | 1/2013 | Choi-Grogan | H04W 36/14 |
| | | | 455/405 |
| 2015/0043504 A1* | 2/2015 | Kato | H04W 72/56 |
| | | | 370/329 |
| 2017/0339685 A1* | 11/2017 | Kato | H04W 72/20 |
| 2018/0103435 A1* | 4/2018 | Kato | H04W 52/50 |
| 2018/0241611 A1 | 8/2018 | He et al. | |
| 2018/0263046 A1* | 9/2018 | Boudreau | H04W 72/121 |
| 2020/0178334 A1* | 6/2020 | Karimli | H04W 28/0268 |
| 2022/0216905 A1* | 7/2022 | Zhang | H04B 7/0626 |

OTHER PUBLICATIONS

3GPP TR 21.915 V1.0.0 (Mar. 2019) 3rd Generation Partnership Project; Technical Specification Group Services and System Aspects; Release 15 Description; Summary of Rel-15 Work Items (Release 15), consisting of 117 pages.

International Telecommunications Union ITU-R, Radio Communication Section of ITU; Report ITU-R M.2320-0 (Nov. 2014); Future Technology Trends of Terrestrial IMT Systems; M Series Mobile, Radiodetermination, Amateur and Related Satellite Services, consisting of 32 pages.

International Search Report and Written Opinion dated Oct. 15, 2020 issued in PCT Application No. PCT/IB2020/057289, consisting of 17 pages.

Report IT-R M.2320 M Series Mobile, Radiodetermination, Amateur and Related Satellite Services; 3GPP Draft; Future Technology Trends of Terrestrial IMT Systems; Mar. 4, 2015, consisting of 33 pages.

3GPP TR 21.915 V0.2.0 (Jul. 2018) 3rd Generation Partnership Project; Technical Specification Group Services and System Aspects; Release 15 Description; Summary of Rel-15 Work Items (Release 15), consisting of 89 pages.

3GPP TR 36.888 V2.1.0 (May 2013) 3rd Generation Partnership Project; Technical Specification Group Radio Access Network; Study on Provision of Low-Cost MTC UEs Based on LTE; (Release 12), consisting of 58 pages.

* cited by examiner

QUALITY OF SERVICE DRIVEN SPECTRUM SHARING

CROSS-REFERENCE TO RELATED APPLICATIONS

This application is a Submission Under 35 U.S.C. § 371 for U.S. National Stage Patent Application of International Application No.: PCT/IB2020/057289, filed Jul. 31, 2020 entitled "QUALITY OF SERVICE DRIVEN SPECTRUM SHARING," which claims priority to U.S. Provisional Application No.: 62/881030, filed Jul. 31, 2019, entitled "4G-5G QOS DRIVEN DL SPECTRUM SHARING," the entireties of both of which are incorporated herein by reference.

TECHNICAL FIELD

The present disclosure relates to wireless communications, and in particular, to the allocation of wireless communication network spectrum (generally referred to herein as "spectrum") resources to schedulers associated with different radio access technologies (RATs) for spectrum sharing such as at a resource element (RE) level.

BACKGROUND

In one or more existing networks, one network node may decide to lend radio resources to a neighboring network having scarce resources based on predicted network load, interference level, vacant resources, homogeneity of both networks. However, this approach does not guarantee the fairness of resource distribution between different nodes since this approach may assume that a primary side owns the spectrum and lends resources to the secondary node. As such, Quality of Service (QoS) satisfaction and fairness among the wireless devices of the sharing nodes are not modelled and/or considered by this approach. Further, this approach may assume permanent connectivity between both nodes in order to exchange information, which may not be an accurate assumption.

In one or more existing networks, non-exclusive sharing of the spectrum may be allowed between different nodes that sense the same spectrum as unoccupied. However, such an approach may only be feasible for non-co-located nodes where the spatial separation provides an opportunity for simultaneous transmission and contention resolution at an acceptable interference level.

Therefore, existing network and approaches for lending and/or sharing of resources may suffer from various issues.

SUMMARY

Some embodiments advantageously provide methods, systems, and apparatuses for allocation of spectrum resources to schedulers associated with different RATs for spectrum sharing.

According to one aspect of the present disclosure, a method for a network node to allocate wireless resources among a plurality of radio access technologies, RATs, is provided. The method includes determining a quality requirement based at least on a historical wireless resource allocation and allocating wireless resources among the plurality of RATs based at least on the determined quality requirement.

In some embodiments of this aspect, the method further includes receiving configuration information associated with a first RAT of the plurality of RATs and configuration information associated with a second RAT of the plurality of RATs. In other embodiments of this aspect, allocating wireless resources includes allocating a first orthogonal frequency division multiplex, OFDM, symbol to the first RAT and allocating a second OFDM symbol to the second RAT, where the first and second OFDM symbols are on one of a shared subcarrier and different subcarriers.

In some embodiments of this aspect, the method further includes receiving peek request information associated with one of the first RAT and the second RAT. The peek request information includes at least one of a wireless device request in a scheduling queue, wireless device priority information, channel conditions, and a required channel type to serve the wireless device request. In another embodiment of this aspect, determining the quality requirement includes determining a maximum CFI value associated with the first RAT to determine whether the wireless resources to be allocated can include wireless resources associated with the second RAT.

In some other embodiments of this aspect, determining the maximum CFI value of the first RAT includes setting the maximum CFI value to a first predefined value, if a maximum CFI condition is met. The maximum CFI condition includes an existing violation of quality of service, QoS, associated with the first RAT and a control channel element, CCE, utilization being greater than a CCE threshold, or a CFI prohibition that is flagged to true. The maximum CFI value is set to a second predefined value, if the maximum CFI condition is not met. In another embodiment of this aspect, the existing violation of QoS is determined at least by determining that a first wireless device request in the first RAT has a higher priority than a second wireless device in the second RAT and a data channel utilization by the first RAT is less than 100%.

In another embodiment of this aspect, allocating wireless resources among the plurality of RATs includes allocating wireless resources associated only with the first RAT when the maximum CFI value equals the first predefined value, and allocating wireless resources associated at least with the first RAT and the second RAT when the maximum CFI value equals the second predefined value.

In some other embodiments of this aspect, allocating wireless resources associated at least with the first RAT and the second RAT further includes determining a QoS violation based at least on the historical wireless resource allocation, determining unused physical resource blocks, PRBs, and a non-guaranteed-bit-rate, GBR, traffic type based at least on the historical wireless resource allocation, and allocating the wireless resources associated at least with the first RAT and the second RAT based at least on one of the determined QoS violation and the determined unused PRBs and non-GBR traffic type. In other embodiments of this aspect, determining a QoS violation includes at least determining at least a minimum bit rate requirement is unsatisfied. In some embodiments of this aspect, allocating wireless resources among the plurality of RATs is further based on the received peek request information.

According to another aspect of the present disclosure, a network node is configured to allocate wireless resources among a plurality of radio access technologies, RATs. The network node includes processing circuitry that has a processor and a memory. The processing circuitry is configured to determine a quality requirement based at least on a historical wireless resource allocation, and allocate wireless resources among the plurality of RATs based at least on the determined quality requirement.

In some embodiments of this aspect, the processing circuitry is further configured to receive configuration information associated with a first RAT from the plurality of RATs and configuration information associated with a second RAT from the plurality of RATs. In other embodiments of this aspect, allocating wireless resources includes allocation of a first orthogonal frequency division multiplex, OFDM, symbol to the first RAT and a second OFDM symbol to the second RAT where the first and second OFDM symbols are on one of a shared subcarrier and different subcarriers.

In another embodiment of this aspect, the processing circuitry is further configured to receive peek request information associated with one of the first RAT and the second RAT. The peek request information includes at least one of a wireless device request in a scheduling queue, wireless device priority information, channel conditions, and required channel types to serve the wireless device request. In another embodiment of this aspect, determining the quality requirement includes determining a maximum CFI value associated with the first RAT to determine whether the wireless resources to be allocated can include wireless resources associated with the second RAT.

In some other embodiments of this aspect, determining the maximum CFI value of the first RAT includes setting the maximum CFI value to a first predefined value, if a maximum CFI condition is met. The maximum CFI condition includes an existing violation of quality of service, QoS, associated with the first RAT and a control channel element, CCE, utilization being greater than a CCE threshold, or a CFI prohibition that is flagged to true. The maximum CFI value is set to a second predefined value, if the maximum CFI condition is not met. In another embodiment of this aspect, the existing violation of QoS is determined at least by determining that a first wireless device request in the first RAT has a higher priority than a second wireless device in the second RAT and a data channel utilization by the first RAT is less than 100%.

In another embodiment of this aspect, allocating wireless resources among the plurality of RATs includes allocating wireless resources associated only with the first RAT when the maximum CFI value equals the first predefined value and allocating wireless resources associated at least with the first RAT and the second RAT when the maximum CFI value equals the second predefined value.

In some other embodiments of this aspect, allocating wireless resources associated at least with the first RAT and the second RAT further includes determining a QoS violation based at least on the historical wireless resource allocation, determining unused physical resource blocks, PRBs, and a non-guaranteed-bit-rate, GBR, traffic type based at least on the historical wireless resource allocation, and allocating the wireless resources associated at least with the first RAT and the second RAT based at least on one of the determined QoS violation and the determined unused PRBs and non-GBR traffic type. In other embodiments of this aspect, determining a QoS violation includes at least determining at least a minimum bit rate requirement is unsatisfied. In some embodiments of this aspect allocating wireless resources among the plurality of RATs is further based on the received peek request information.

According to another aspect of the present disclosure, a method for a controller to allocate wireless resources among a plurality of radio access technologies, RATs, is provided. The method includes determining a quality requirement based at least on a historical wireless resource allocation and allocating wireless resources among the plurality of RATs based at least on the determined quality requirement.

In some embodiments of this aspect, the method further includes receiving configuration information associated with a first RAT from the plurality of RATs and configuration information associated with a second RAT from the plurality of RATs. In other embodiments of this aspect, allocating wireless resources includes allocation of a first orthogonal frequency division multiplex, OFDM, symbol to the first RAT and a second OFDM symbol to the second RAT where the first and second OFDM symbols are on one of a shared subcarrier and different subcarriers.

In another embodiment of this aspect, the method further includes receiving peek request information associated with one of the first RAT and the second RAT. The peek request information includes at least one of a wireless device request in a scheduling queue, wireless device priority information, channel conditions, and required channel types to serve the wireless device request. In some embodiments of this aspect, determining the quality requirement includes determining a maximum CFI value associated with the first RAT to determine whether the wireless resources to be allocated can include wireless resources associated with the second RAT.

In some other embodiments of this aspect, determining the maximum CFI value of the first RAT includes setting the maximum CFI value to a first predefined value, if a maximum CFI condition is met. The maximum CFI condition includes an existing violation of quality of service, QoS, associated with the first RAT and a control channel element, CCE, utilization being greater than a CCE threshold, or a CFI prohibition that is flagged to true. The maximum CFI value is set to a second predefined value, if the maximum CFI condition is not met. In another embodiment of this aspect, the existing violation of QoS is determined at least by determining that a first wireless device request in the first RAT has a higher priority than a second wireless device in the second RAT and a data channel utilization by the first RAT is less than 100%.

In another embodiment of this aspect, allocating wireless resources among the plurality of RATs includes allocating wireless resources associated only with the first RAT when the maximum CFI value equals the first predefined value and allocating wireless resources associated at least with the first RAT and the second RAT when the maximum CFI value equals the second predefined value.

In some other embodiments of this aspect, allocating wireless resources associated at least with the first RAT and the second RAT further includes determining a QoS violation based at least on the historical wireless resource allocation, determining unused physical resource blocks, PRBs, and a non-guaranteed-bit-rate, GBR, traffic type based at least on the historical wireless resource allocation, and allocating the wireless resources associated at least with the first RAT and the second RAT based at least on one of the determined QoS violation and the determined unused PRBs and non-GBR traffic type. In other embodiments of this aspect, determining a QoS violation includes at least determining at least a minimum bit rate requirement is unsatisfied. In another embodiment of this aspect, allocating wireless resources among the plurality of RATs is further based on the received peek request information.

According to one aspect of the present disclosure, a controller is configured to allocate wireless resources among a plurality of radio access technologies, RATs. The controller includes processing circuitry that has a processor and a memory. The processing circuitry is configured to determine a quality requirement based at least on a historical wireless resource allocation and allocate wireless resources among the plurality of RATs based at least on the determined quality requirement.

In some embodiments of this aspect, the processing circuitry is further configured to receive configuration information associated with a first RAT from the plurality of RATs and configuration information associated with a second RAT from the plurality of RATs. In other embodiments of this aspect, allocating wireless resources includes allocation of a first orthogonal frequency division multiplex, OFDM, symbol to the first RAT and a second OFDM symbol to the second RAT where the first and second OFDM symbols are on one of a shared subcarrier and different subcarriers.

In another embodiment of this aspect, the processing circuitry is further configured to receive peek request information associated with one of the first RAT and the second RAT. The peek request information includes at least one of a wireless device request in a scheduling queue, wireless device priority information, channel conditions, and required channel types to serve the wireless device request. In some embodiments of this aspect, determining the quality requirement includes determining a maximum CFI value associated with the first RAT to determine whether the wireless resources to be allocated can include wireless resources associated with the second RAT.

In some other embodiments of this aspect, determining the maximum CFI value of the first RAT includes setting the maximum CFI value to a first predefined value, if a maximum CFI condition is met. The maximum CFI condition includes an existing violation of quality of service, QoS, associated with the first RAT and a control channel element, CCE, utilization being greater than a CCE threshold, or a CFI prohibition that is flagged to true. The maximum CFI value is set to a second predefined value, if the maximum CFI condition is not met. In another embodiment of this aspect, the existing violation of QoS is determined at least by determining that a first wireless device request in the first RAT has a higher priority than a second wireless device in the second RAT and a data channel utilization by the first RAT is less than 100%.

In another embodiment of this aspect, allocating wireless resources among the plurality of RATs includes allocating wireless resources associated only with the first RAT when the maximum CFI value equals the first predefined value and allocating wireless resources associated at least with the first RAT and the second RAT when the maximum CFI value equals the second predefined value.

In some other embodiments of this aspect, allocating wireless resources associated at least with the first RAT and the second RAT further includes determining a QoS violation based at least on the historical wireless resource allocation, determining unused physical resource blocks, PRBs, and a non-guaranteed-bit-rate, GBR, traffic type based at least on the historical wireless resource allocation, and allocating the wireless resources associated at least with the first RAT and the second RAT based at least on one of the determined QoS violation and the determined unused PRBs and non-GBR traffic type. In other embodiments of this aspect, determining a QoS violation includes at least determining at least a minimum bit rate requirement is unsatisfied. In another embodiment of this aspect, allocating wireless resources among the plurality of RATs is further based on the received peek request information.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
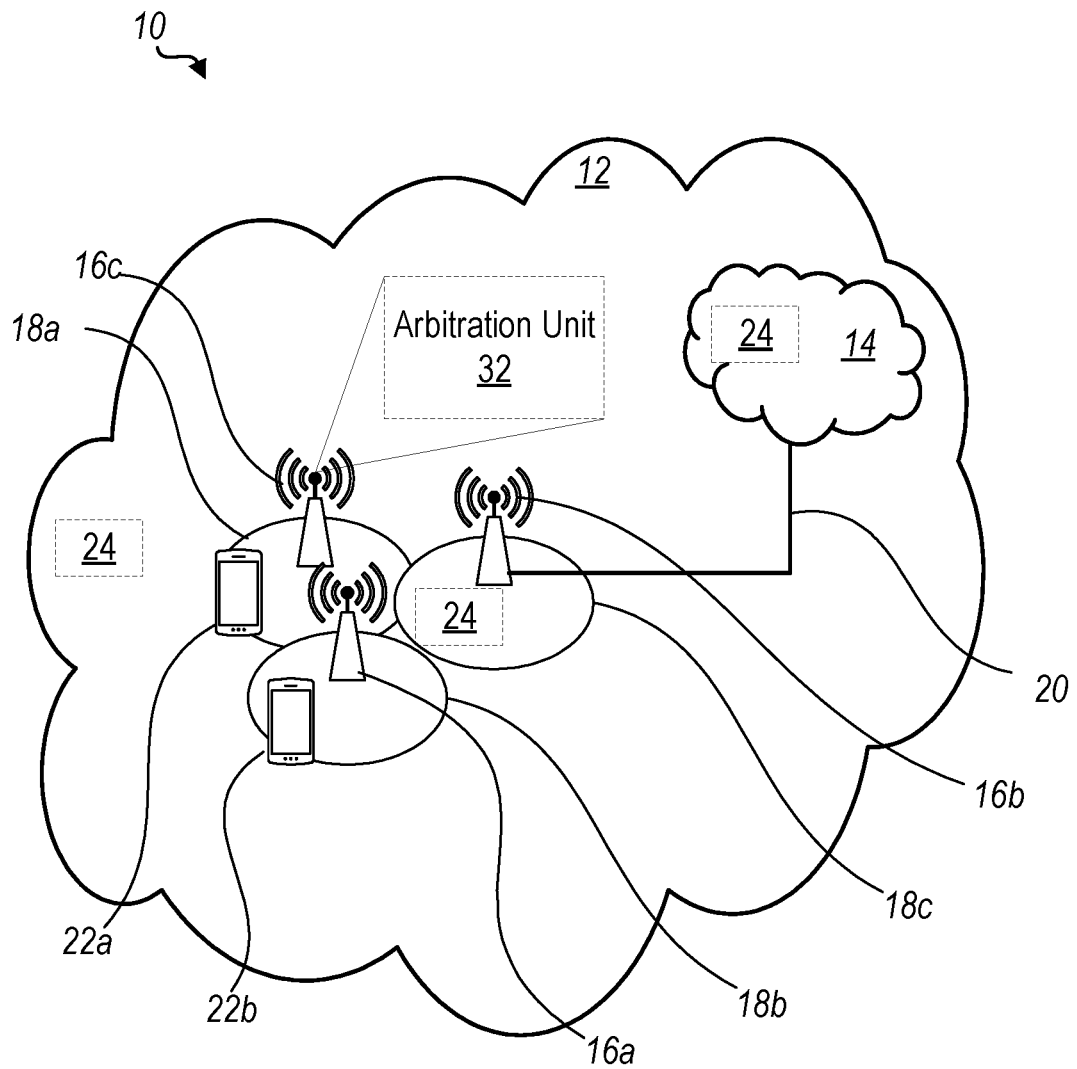
FIG. 1 is a schematic diagram of an exemplary network architecture illustrating a communication system according to the principles in the present disclosure.

Before describing in detail exemplary embodiments, it is noted that the embodiments reside primarily in combinations of apparatus components and processing steps related to the allocation of spectrum resources to schedulers associated with different RATs for spectrum sharing such as at a resource element level.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments, the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

The term TTI used herein may correspond to any time period (TO) over which a physical channel can be encoded and interleaved for transmission. The physical channel is decoded by the receiver over the same time period (TO) over which it was encoded. The TTI may also interchangeably called as short TTI (sTTI), transmission time, slot, sub-slot, mini-slot, short subframe (SSF), mini-subframe etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A channel may generally be a logical or physical channel. A channel may comprise and/or be arranged on one or more carriers, in particular a plurality of subcarriers. A wireless communication network may comprise at least one network node, in particular a network node as described herein. A terminal connected or communicating with a network may be considered to be connected or communicating with at least one network node, in particular any one of the network nodes described herein.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device, controller or a network node may be distributed over a plurality of wireless devices and/or network nodes and/or controllers. In other words, it is contemplated that the functions of the network node, controller and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide an allocation of spectrum resources to schedulers associated with different radio access technologies (RATs) for spectrum sharing such as at a resource element (RE) level.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. In one or more embodiments, controller 24 may be provided where controller 24 may be co-located with network node 16, may be part of a cloud computing system, etc. In one or more embodiments, the functionality of controller 24 as described herein is provided by arbitration unit 32 that may be part of one or more network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with one or more of an eNB for LTE/E-UTRAN and a gNB for NR/NG-RAN.

The communication system 10 may itself be connected to a controller 24, which may be embodied in the hardware and/or software of a standalone device, a cloud-implemented device, a distributed device, part of network node 16 or as processing resources in a server farm or part of the RAT scheduler itself.

A network node 16 is configured to include an arbitration unit 32 which is configured to perform one or more network node functions described herein such as with respect to allocating wireless resources, including spectrum resources, to RATs and/or to schedulers of various RATs, such as for spectrum sharing, e.g., at the RE level.

Example implementations, in accordance with an embodiment, of the WD 22, network node 16 and controller 24 discussed in the preceding paragraphs will now be described with reference to FIG. 2. In a communication system 10, a controller 24 comprises hardware (HW) 34 including a communication interface 36 configured to set up and maintain a wired or wireless connection with one or more interfaces of a different communication device of the communication system 10 such as with an LTE interface of an LTE network node 16 and/or a NR interface of a NR network node 16. The controller 24 further comprises processing circuitry 38, which may have storage and/or processing capabilities. The processing circuitry 38 may include a processor 40 and memory 42. In particular, in addition to or instead of a processor, such as a central processing unit, and memory, the processing circuitry 38 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 38 may be configured to control any of the methods and/or processes described herein and/or to cause such methods, and/or processes to be performed, e.g., by controller 24. Processor 40 corresponds to one or more processors 40 for performing controller 24 functions described herein. The controller 24 includes memory 42 that is configured to store data, programmatic software code and/or other information described herein. In some embodiments, the software 44 may include instructions that, when executed by the processor 40 and/or processing circuitry 38, causes the processor 40 and/or processing circuitry 38 to perform the processes described herein with respect to controller 24. The instructions may be the software 44 associated with the controller 24.

The software 44 may be executable by the processing circuitry 38. The processing circuitry 38 of the controller 24 may enable the controller 24 to perform one or more controller 24 functions described here such as those functions with respect to the allocation of spectrum to various schedulers of various RATs, as described herein. The processing circuitry 38 of the controller 24 may include an arbitration unit 32 configured to perform one or more controller 24 functions described herein such as those controller 24 functions related to allocation of spectrum resources described herein.

The communication system 10 further includes a network node 16 provided in a communication system 10 and including hardware 46 enabling it to communicate with the controller 24 and with the WD 22. The hardware 46 may include a communication interface 48 for setting up and maintaining a wired or wireless connection with an interface of a different communication device of the communication system 10, as well as a radio interface 50 for setting up and maintaining at least a wireless connection 63 with a WD 22 located in a coverage area 18 served by the network node 16. The radio interface 62 may be formed as or may include, for example, one or more RF transmitters, one or more RF receivers, and/or one or more RF transceivers. The communication interface 48 may be configured to facilitate a connection 65 to the controller 24 and/or other network nodes 16. The connection 65 may be direct or it may pass through a core network 14 of the communication system 10 and/or through one or more intermediate networks outside the communication system 10.

In the embodiment shown, the hardware 46 of the network node 16 further includes processing circuitry 52. The processing circuitry 52 may include a processor 54 and a memory 56. In particular, in addition to or instead of a processor, such as a central processing unit, and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 54 may be configured to access (e.g., write to and/or read from) the memory 56, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 58 stored internally in, for example, memory 56, or stored in external memory (e.g., database, storage array, network storage device, etc.) accessible by the network node 16 via an external connection. The software 58 may be executable by the processing circuitry 52. The processing circuitry 52 may be configured to control any of the methods and/or processes described herein and/or to cause such methods, and/or processes to be performed, e.g., by network node 16. Processor 54 corresponds to one or more processors 54 for performing network node 16 functions described herein. The memory 56 is configured to store data, programmatic software code and/or other information described herein. In some embodiments, the software 58 may include instructions that, when executed by the processor 54 and/or processing circuitry 52, causes the processor 54 and/or processing circuitry 52 to perform the processes described herein with respect to network node 16. For example, processing circuitry 52 of the network node 16 may include arbitration unit 32 configured to perform one or more functions described herein such as with respect to allocating spectrum to one or more RAT scheduler 57 that may be part of network node 16 and/or part of one or more other network nodes 16. The processing circuitry 52 may also include RAT scheduler 57 configured to apply a scheduling method for scheduling one or more wireless devices 22 according to resources allocated by controller 24 or arbitration unit 32 (where, in one or more embodiments, arbitration unit 32 performs functionality of controller 24 described herein). In one or more embodiments, RAT scheduler 57 is generally configured to schedule one or more wireless devices 22 served by the network node 16 for communication. RAT scheduler 57 may also be referred to herein as LTE scheduler 57 (i.e., if part of a LTE network node 16), NR scheduler 57 (i.e., if part of a NR network node 16) and/or scheduler 57.

The communication system 10 further includes the WD 22 already referred to. The WD 22 may have hardware 60 that may include a radio interface 62 configured to set up and maintain a wireless connection 63 with a network node 16 serving a coverage area 18 in which the WD 22 is currently located. The radio interface 62 may be formed as or may include, for example, one or more RF transmitters, one or more RF receivers, and/or one or more RF transceivers.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 68 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22. The client application 92 may interact with the user to generate the user data that it provides.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 2:
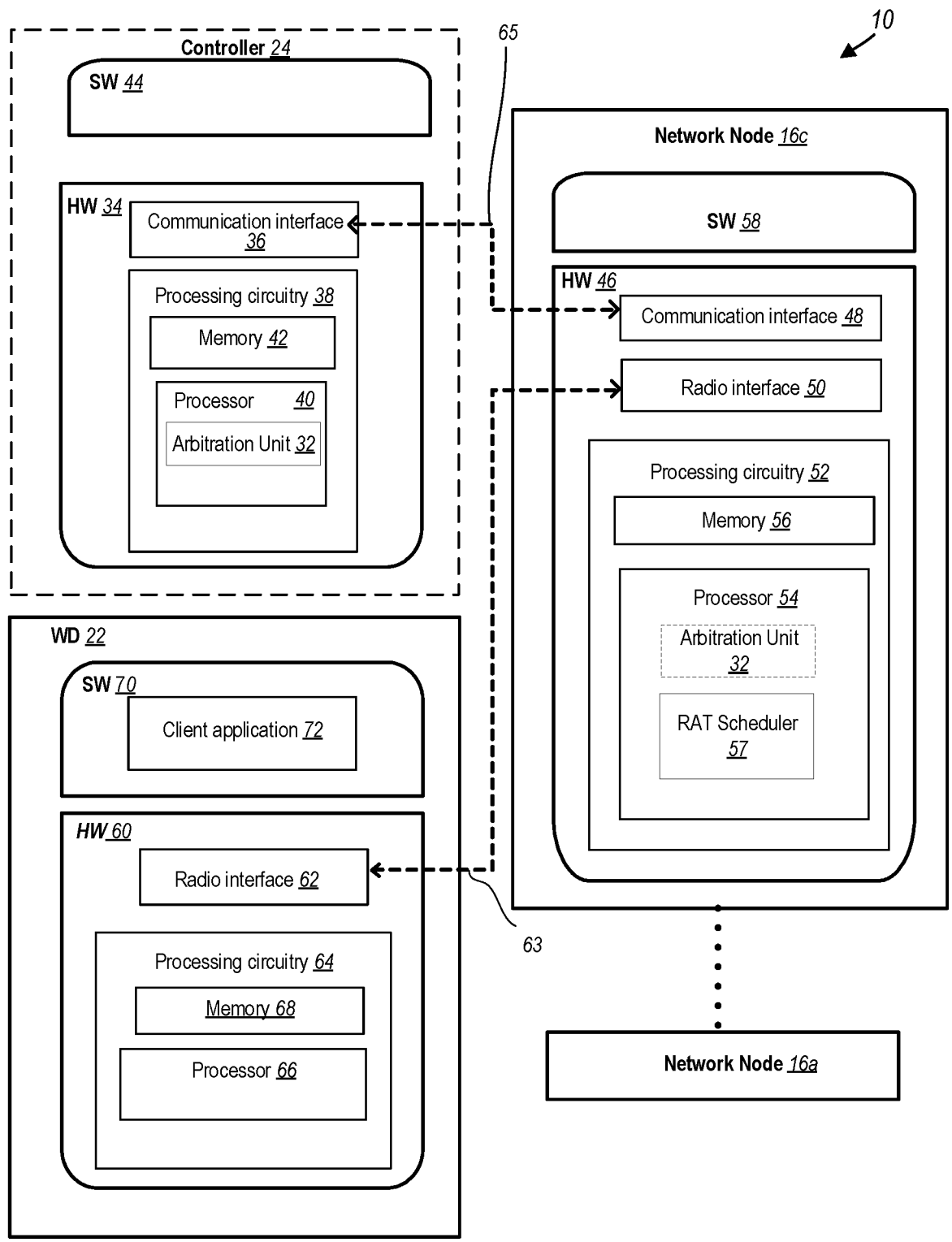
FIG. 2 is a block diagram of a network node in communication with a wireless device and/or a controller over an at least partially wireless connection according to some embodiments of the present disclosure.

In some embodiments, the inner workings of the network node 16, WD 22, and controller 24 may be as shown in FIG. 2 and independently, the surrounding network topology may be that of FIG. 1.

The wireless connection 63 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as arbitration unit 32, and RAT scheduler 57 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
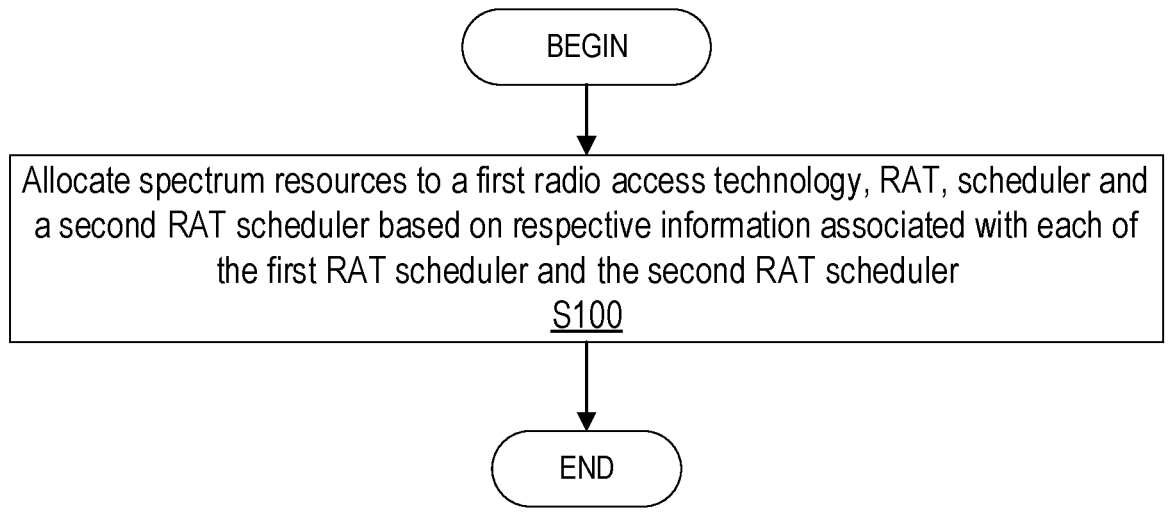
FIG. 3 is a flowchart of an exemplary process in a network node according to some embodiments of the present disclosure.

FIG. 3 is a flowchart of an exemplary process in a network node 16 for according to one or more embodiments of the present disclosure. One or more Blocks and/or functions performed by network node 16 may be performed by one or more elements of network node 16, such as by arbitration unit 32 in processing circuitry 52, processor 54, communication interface 48, radio interface 50, etc. In one or more embodiments, network node 16, such as via one or more of processing circuitry 52, processor 54, communication interface 48 and radio interface 50, is configured to allocate (Block S100) spectrum resources to the first RAT scheduler 57 and the second RAT scheduler 57 based on respective information associated with each of the first RAT scheduler 57 and the second RAT scheduler 57. For example, the first RAT scheduler 57 may be associated with a first network node 16 while the second RAT scheduler 57 may be associated with a second network node 16. In one or more embodiments, one or more of the first RAT scheduler 57 and the second RAT scheduler 57 may include multiple RAT schedulers 57 of the same RAT.

According to one or more embodiments, the allocation of spectrum resources includes allocation of a first OFDM symbol to the first RAT scheduler 57 and a second OFDM symbol to the second RAT scheduler 57 where the first and second OFDM symbols are on a same or different subcarrier and rate matched to each other, thereby allowing spectrum sharing at the RE level. According to one or more embodiments, the information includes at least one of: configuration information associated with at least one of reference signals, broadcast channels, symbol indices of both control and shared channels, and peek requests information associated with at least one of wireless device 22 requests in a scheduling queue, priority information, channel conditions and required channel types.

According to one or more embodiments, the spectrum resources are allocated, such as via one or more of processing circuitry 52, processor 54, communication interface 48 and radio interface 50, to satisfy a quality of service of predefined priority requests and to maximize at least one network performance indicator or at least improve at least one network performance indication from a first value to a second value. According to one or more embodiments, the network node 16 is a first RAT network node 16, and the processing circuitry 52 such as via RAT scheduler 57 is further configured to apply a scheduling method based on the allocated resources for the first RAT scheduler 57 for requests received from first RAT wireless devices 22. According to one or more embodiments, the information includes historical use/user/wireless device 22 information associated with the first RAT scheduler 57 and second RAT scheduler 57 where the historical use/user/wireless device 22 information includes at least one of: a quantity of use Physical Resource Blocks, PRBs, a quantity of unscheduled wireless devices 22, resources required to serve wireless devices 22, updated channel condition information, and the QoS or quality of experience (QoE) requirements of packet requests which might be represented by priority or scheduling weights and can be configured manually or automatically updated over time, or both.

Figure 4:
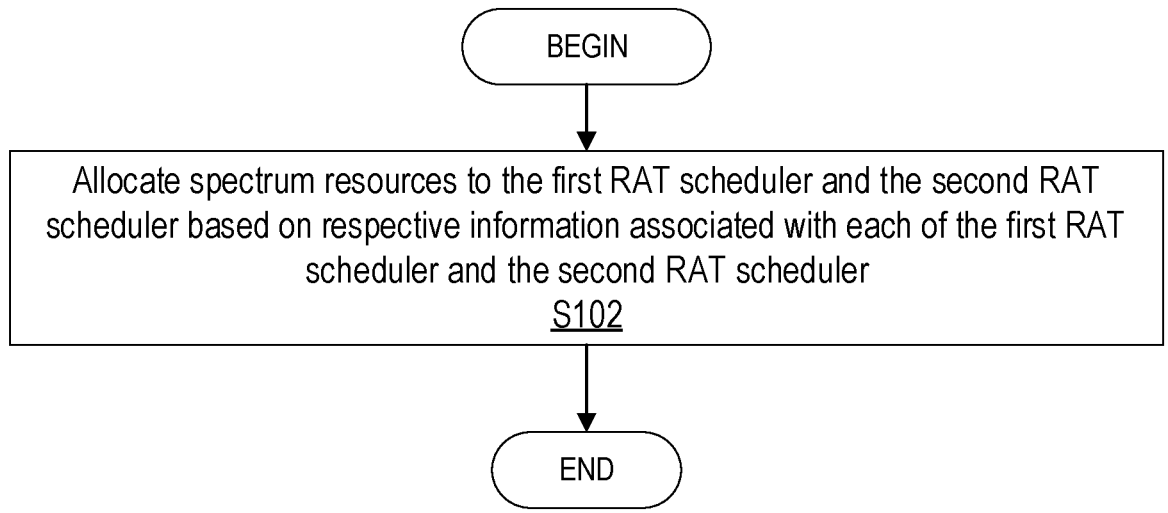
FIG. 4 is a flowchart of an exemplary process in a controller according to some embodiments of the present disclosure.

FIG. 4 is a flowchart of an exemplary process in a controller 24 according to one or more embodiments of the present disclosure. One or more Blocks and/or functions performed by controller 24 may be performed by one or more elements of controller 24 such as by arbitration unit 32 in processing circuitry 38, processor 40, communication interface 36, etc. In one or more embodiments, controller 24, such as via one or more of processing circuitry 38, processor 40 and communication interface 36, is configured to allocate (Block S102) spectrum resources to the first RAT scheduler 57 and the second RAT scheduler 57 based on respective information associated with each of the first RAT scheduler 57 and the second RAT scheduler 57. In one or more embodiments, one or more of the first RAT scheduler 57 and the second RAT scheduler 57 may include multiple RAT schedulers 57 of the same RAT.

According to one or more embodiments, the allocation of spectrum resources includes allocation a first OFDM symbol to the first RAT scheduler 57 and a second OFDM symbol to the second RAT scheduler 57 where the first and second OFDM symbols are on a same subcarrier and rate matched to each other. According to one or more embodiments, the information includes at least one of: configuration information associated with at least one of reference signals, broadcast channels, symbol indices of both control and shared channels, and peek requests information associated with at least one of wireless device 22 requests in a scheduling queue, priority information, channel conditions and required channel types.

According to one or more embodiments, the spectrum resources are allocated, such as via one or more of processing circuitry 38, processor 40 and communication interface 36, to satisfy quality of service of predefined priority requests and to at least improve at least one network performance indicator from a first value to a second value. According to one or more embodiments, the information includes historical user information associated with the first RAT scheduler 57 and second RAT scheduler 57, and the historical user information including at least one of: a quantity of use Physical Resource Blocks, PRBs; a quantity of unscheduled wireless devices; resources required to search wireless devices; updated channel condition information; and quality of service (QoS) requirement of packet requests.

Figure 5:
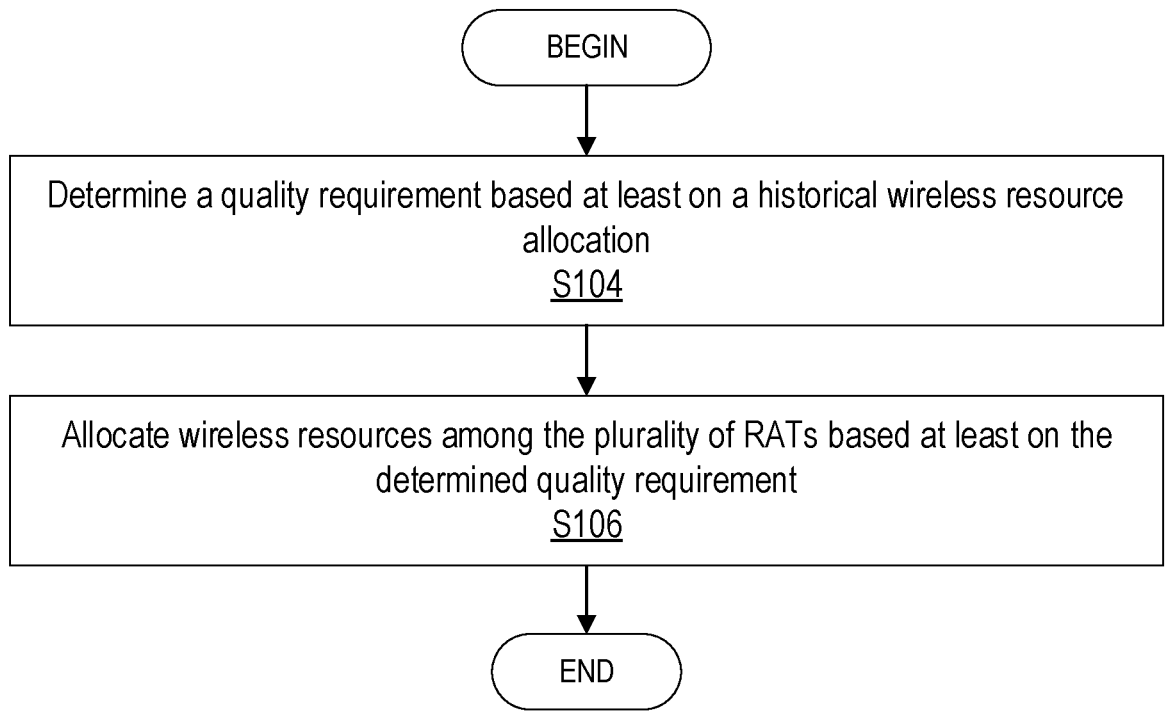
FIG. 5 is a flowchart of another exemplary process in a network node according to some embodiments of the present disclosure.

FIG. 5 is a flowchart of an exemplary process in a network node 16 according to one or more embodiments of the present disclosure. One or more Blocks and/or functions performed by network node 16 may be performed by one or more elements of network node 16, such as by arbitration unit 32 in processing circuitry 52, processor 54, communication interface 48, radio interface 50, etc. In one or more embodiments, network node 16 is configured to determine (Block S104), such as via one or more of processing circuitry 52, processor 54, arbitration unit 32, communication interface 48, and radio interface 50, a quality requirement based at least on a historical wireless resource allocation. The network node 16 is also configured to allocate (Block S106), such as via one or more of processing circuitry 52, processor 54, arbitration unit 32, communication interface 48, and radio interface 50, wireless resources among the plurality of RATs based at least on the determined quality requirement.

In some embodiments of this aspect, the method further includes receiving, such as via one or more of processing circuitry 52, processor 54, arbitration unit 32, communication interface 48, and radio interface 50, configuration information associated with a first RAT of the plurality of RATs and configuration information associated with a second RAT of the plurality of RATs. In other embodiments of this aspect, allocating wireless resources includes allocating, such as via one or more of processing circuitry 52, processor 54, arbitration unit 32, communication interface 48, and radio interface 50, a first orthogonal frequency division multiplex, OFDM, symbol to the first RAT and allocating, such as via one or more of processing circuitry 52, processor 54, arbitration unit 32, communication interface 48, and radio interface 50, a second OFDM symbol to the second RAT, where the first and second OFDM symbols are on one of a shared subcarrier and different subcarriers.

In some embodiments of this aspect, the method further includes receiving, such as via one or more of processing circuitry 52, processor 54, arbitration unit 32, communication interface 48, and radio interface 50, peek request information associated with one of the first RAT and the second RAT, the peek request information including at least one of a wireless device request in a scheduling queue, wireless device priority information, channel conditions, and a required channel type to serve the wireless device request. In another embodiment of this aspect, determining the quality requirement includes determining, such as via one or more of processing circuitry 52, processor 54, arbitration unit 32, communication interface 48, and radio interface 50, a maximum CFI value associated with the first RAT to determine whether the wireless resources to be allocated can include wireless resources associated with the second RAT.

In some other embodiments of this aspect, determining the maximum CFI value of the first RAT includes setting, such as via one or more of processing circuitry 52, processor 54, arbitration unit 32, communication interface 48, and radio interface 50, the maximum CFI value to a first predefined value, if a maximum CFI condition is met. The maximum CFI condition includes an existing violation of quality of service, QoS, associated with the first RAT and a control channel element, CCE, utilization being greater than a CCE threshold, or a CFI prohibition is flagged to true. The maximum CFI value is set, such as via one or more of processing circuitry 52, processor 54, arbitration unit 32, communication interface 48, and radio interface 50, to a second predefined value, if the maximum CFI condition is not met. In another embodiment of this aspect, the existing violation of QoS is determined at least by determining, such as via one or more of processing circuitry 52, processor 54, arbitration unit 32, communication interface 48, and radio interface 50, that a first wireless device request in the first RAT has a higher priority than a second wireless device in the second RAT and a data channel utilization by the first RAT is less than 100%.

In another embodiment of this aspect, allocating wireless resources among the plurality of RATs includes allocating, such as via one or more of processing circuitry 52, processor 54, arbitration unit 32, communication interface 48, and radio interface 50, wireless resources associated only with the first RAT when the maximum CFI value equals the first predefined value, and allocating, such as via one or more of processing circuitry 52, processor 54, arbitration unit 32, communication interface 48, and radio interface 50, wireless resources associated at least with the first RAT and the second RAT when the maximum CFI value equals the second predefined value.

In some other embodiments of this aspect, allocating wireless resources associated at least with the first RAT and the second RAT further includes determining, such as via one or more of processing circuitry 52, processor 54, arbitration unit 32, communication interface 48, and radio interface 50, a QoS violation based at least on the historical wireless resource allocation, determining, such as via one or more of processing circuitry 52, processor 54, arbitration unit 32, communication interface 48, and radio interface 50, unused physical resource blocks, PRBs, and a non-guaranteed-bit-rate, GBR, traffic type based at least on the historical wireless resource allocation, and allocating, such as via one or more of processing circuitry 52, processor 54, arbitration unit 32, communication interface 48, and radio interface 50, the wireless resources associated at least with the first RAT and the second RAT based at least on one of the determined QoS violation and the determined unused PRBs and non-GBR traffic type. In other embodiments of this aspect, determining a QoS violation includes at least determining, such as via one or more of processing circuitry 52, processor 54, arbitration unit 32, communication interface 48, and radio interface 50, at least a minimum bit rate requirement is unsatisfied. In some embodiments of this aspect, allocating, such as via one or more of processing circuitry 52, processor 54, arbitration unit 32, communication interface 48, and radio interface 50, wireless resources among the plurality of RATs is further based on the received peek request information.

Figure 6:
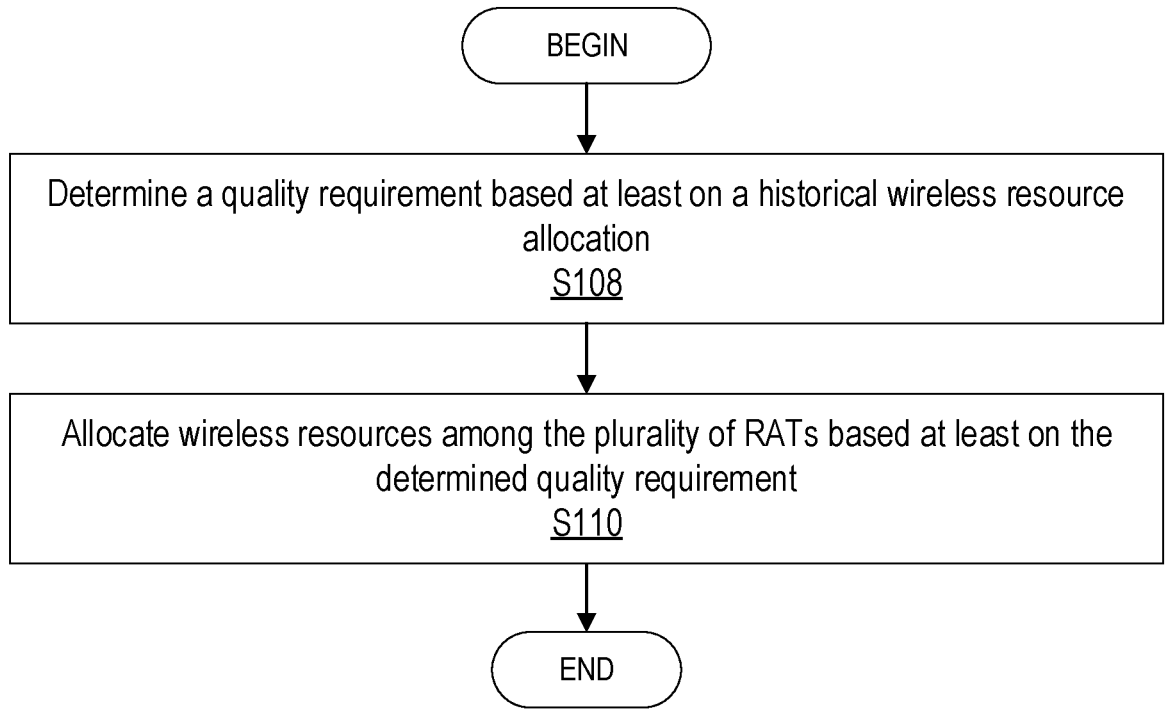
FIG. 6 is a flowchart of another exemplary process in a controller according to some embodiments of the present disclosure.

FIG. 6 is a flowchart of an exemplary process in a controller 24 according to one or more embodiments of the present disclosure. One or more Blocks and/or functions performed by controller 24 may be performed by one or more elements of controller 24, such as by arbitration unit 32 in processing circuitry 38, processor 40, communication interface 36, etc. In one or more embodiments, controller 24 is configured to determine (Block S108), such as via one or more of processing circuitry 38, processor 40, arbitration unit 32, communication interface 36, a quality requirement based at least on a historical wireless resource allocation. The controller 24 is also configured to allocate (Block S110), such as via one or more of processing circuitry 38, processor 40, arbitration unit 32, communication interface 36, wireless resources among the plurality of RATs based at least on the determined quality requirement.

In some embodiments of this aspect, the method further includes receiving, such as via one or more of processing circuitry 38, processor 40, arbitration unit 32, communication interface 36, configuration information associated with a first RAT of the plurality of RATs and configuration information associated with a second RAT of the plurality of RATs. In other embodiments of this aspect, allocating wireless resources includes allocating, such as via one or more of processing circuitry 38, processor 40, arbitration unit 32, communication interface 36, a first orthogonal frequency division multiplex, OFDM, symbol to the first RAT and allocating, such as via one or more of processing circuitry 38, processor 40, arbitration unit 32, communication interface 36, a second OFDM symbol to the second RAT, where the first and second OFDM symbols are on one of a shared subcarrier and different subcarriers.

In some embodiments of this aspect, the method further includes receiving, such as via one or more of processing circuitry 38, processor 40, arbitration unit 32, communication interface 36, peek request information associated with one of the first RAT and the second RAT, the peek request information including at least one of a wireless device request in a scheduling queue, wireless device priority information, channel conditions, and a required channel type to serve the wireless device request. In another embodiment of this aspect, determining the quality requirement includes determining, such as via one or more of processing circuitry 38, processor 40, arbitration unit 32, communication interface 36, a maximum CFI value associated with the first RAT to determine whether the wireless resources to be allocated can include wireless resources associated with the second RAT.

In some other embodiments of this aspect, determining the maximum CFI value of the first RAT includes setting, such as via one or more of processing circuitry 38, processor 40, arbitration unit 32, communication interface 36, the maximum CFI value to a first predefined value, if a maximum CFI condition is met. The maximum CFI condition includes an existing violation of quality of service, QoS, associated with the first RAT and a control channel element, CCE, utilization being greater than a CCE threshold, or a CFI prohibition is flagged to true. The maximum CFI value is set, such as via one or more of processing circuitry 38, processor 40, arbitration unit 32, communication interface 36, to a second predefined value, if the maximum CFI condition is not met. In another embodiment of this aspect, the existing violation of QoS is determined at least by determining, such as via one or more of processing circuitry 38, processor 40, arbitration unit 32, communication interface 36, that a first wireless device request in the first RAT has a higher priority than a second wireless device in the second RAT and a data channel utilization by the first RAT is less than 100%.

In another embodiment of this aspect, allocating wireless resources among the plurality of RATs includes allocating, such as via one or more of processing circuitry 38, processor 40, arbitration unit 32, communication interface 36, wireless resources associated only with the first RAT when the maximum CFI value equals the first predefined value, and allocating, such as via one or more of processing circuitry 38, processor 40, arbitration unit 32, communication interface 36, wireless resources associated at least with the first RAT and the second RAT when the maximum CFI value equals the second predefined value.

In some other embodiments of this aspect, allocating wireless resources associated at least with the first RAT and the second RAT further includes determining, such as via one or more of processing circuitry 38, processor 40, arbitration unit 32, communication interface 36, a QoS violation based at least on the historical wireless resource allocation, determining, such as via one or more of processing circuitry 38, processor 40, arbitration unit 32, communication interface 36, unused physical resource blocks, PRBs, and a non-guaranteed-bit-rate, GBR, traffic type based at least on the historical wireless resource allocation, and allocating, such as via one or more of processing circuitry 38, processor 40, arbitration unit 32, communication interface 36, the wireless resources associated at least with the first RAT and the second RAT based at least on one of the determined QoS violation and the determined unused PRBs and non-GBR traffic type. In other embodiments of this aspect, determining a QoS violation includes at least determining, such as via one or more of processing circuitry 38, processor 40, arbitration unit 32, communication interface 36, at least a minimum bit rate requirement is unsatisfied. In some embodiments of this aspect, allocating, such as via one or more of processing circuitry 38, processor 40, arbitration unit 32, communication interface 36, wireless resources among the plurality of RATs is further based on the received peek request information.

Having generally described arrangements for allocation of spectrum resources to a first RAT scheduler 57 and a second RAT scheduler 57, details for these arrangements, functions and processes are provided as follows, and which may be implemented by the network node 16, wireless device 22 and/or controller 24. Embodiments provide for allocating spectrum resources among various RAT schedulers 57 of different RATs.

Figure 7:
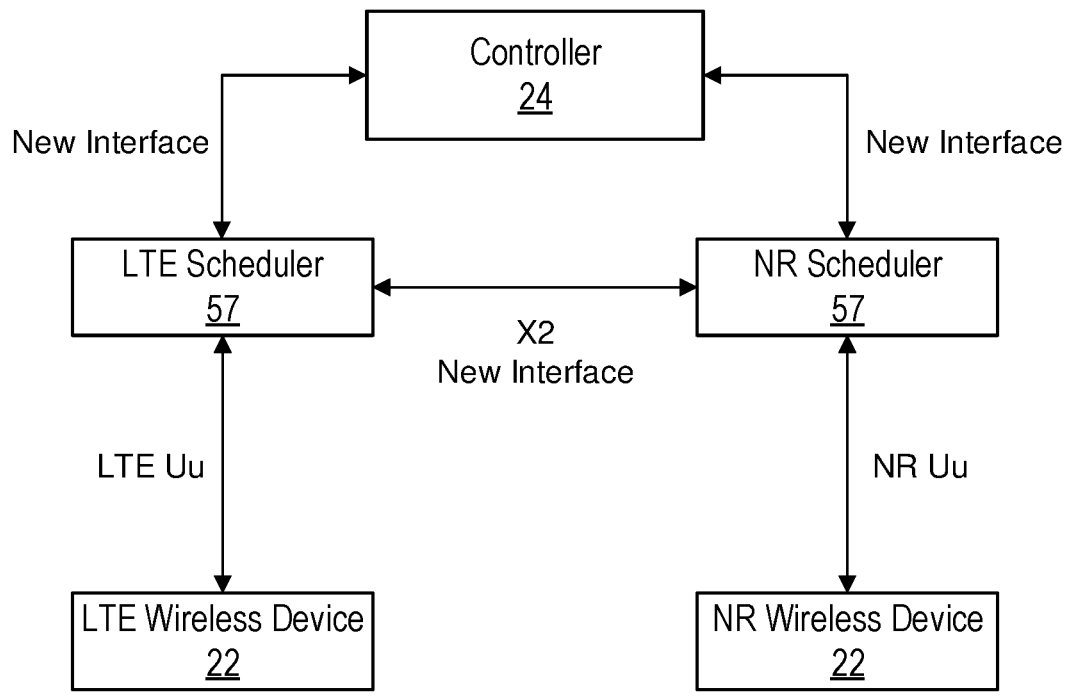
FIG. 7 is a signaling diagram according to some embodiments of the present disclosure.
Figure 8:
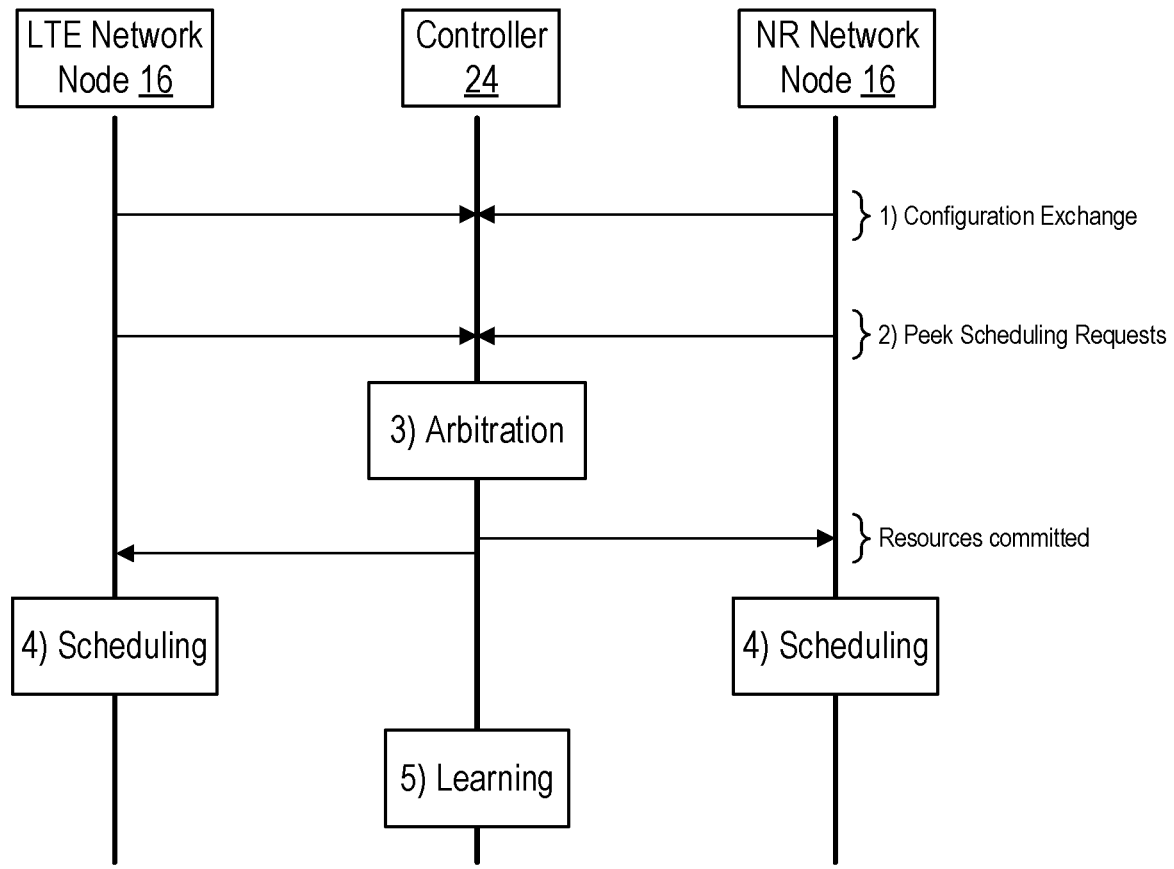
FIG. 8 is another signaling diagram according to some embodiments of the present disclosure.

A new entity (i.e., controller 24) that dynamically controls the spectrum split between a first RAT, i.e., first RAT scheduler 57, and a second RAT, i.e., a second RAT scheduler 57, described herein and shown in FIG. 7. In particular, FIG. 7 is a diagram illustrating a first interface of controller 24, i.e., LTE to Arbitrator interface, and a second interface of controller 24, i.e., NR to Arbitrator interface. Controller 24 may be independent of both LTE and NR as illustrated in FIGS. 1, 2 and 8 where controller 24 is a standalone device or incorporated with core network 14, for example. In one or more embodiments, the functionality of controller 24 may be implemented by arbitration unit 32 that may be physically located and/or be part of either RAT network node 16 as illustrated in FIG. 2. The RAT scheduler 57 of each RATs can be connected to each other directly (through an X2 interface for instance such as via a new interface implemented via communication interface 36 and/or 48 for communication over the backhaul) and can be also connected indirectly through the controller 24 where communication at different time granularities is allowed over the first interface and/or second interface.

FIG. 8 is a signaling diagram illustrating signaling between a NR scheduler 57 that may be associated with a NR network node 16, LTE scheduler 57 that may be associated with a LTE network node 16 and controller 24. In particular, FIG. 8 illustrates the interaction between the schedulers 57 of both RATs (sharing the spectrum) and spectrum sharing controller 24, which is summarized in the following steps:

1) Configuration Exchange

In this stage, each RAT scheduler 57 of each network node 16 sends information to controller 24 where the information includes the configuration of one or more of the RAT scheduler reference signals (e.g., one or more of periodicity, symbol indices, . . . etc.), broadcast channels, symbol indices of both control and shared channels, paging profile, and the bandwidth of the RAT scheduler radio device to limit the maximum allowed spectrum, among others. The information may also indicate the granularity of message exchange, i.e., how frequently the messages are exchanged, between the respective RAT scheduler 57 and controller 24 such that the information indicates how frequently specific messages are exchanged, for example, where the controller 24 may control the spectrum splitting interval (i.e., for how long the RAT can keep using the spectrum). This information exchange allows the controller 24 to prioritize special type of signals by always allocating the required resources for these special types of signals. In addition, information about the other RAT scheduler 57 is also exchanged to allow both RATs to transmit on two different OFDM symbols transmitted on the same subcarrier by using, for example, rate matching allowed in the 3GPP standard, i.e., allows both RAT schedulers 57 to schedule on two different OFDM symbols transmitted on the same subcarrier using, for example, rate matching allowed in the 3GPP standard, thereby allowing spectrum sharing between at least two RATs at the RE level, for example. In one or more embodiments, "communication exchange" corresponds to network nodes 16 transmitting information to controller 24 where controller 24 receives this information for processing as described herein.

2) Peek Requests

Every t ms (or μs), each RAT scheduler 57 of each network node 16 sends, to controller 24, information such as about one or more of the RAT scheduler 57's wireless device 22 requests in the scheduling queue, priorities of the requests (which change over time based on the obtained scheduling opportunities), the channel conditions and the required channel types and their symbol indices to serve the requests. In one or more embodiments, controller 24 may obtain the requests from different methods such as from the scheduling queue or upper layers (i.e., Open System Interconnection (OSI) communication layers) generating the requests to the RAT scheduler 57.

3) Arbitration

Figure 9:
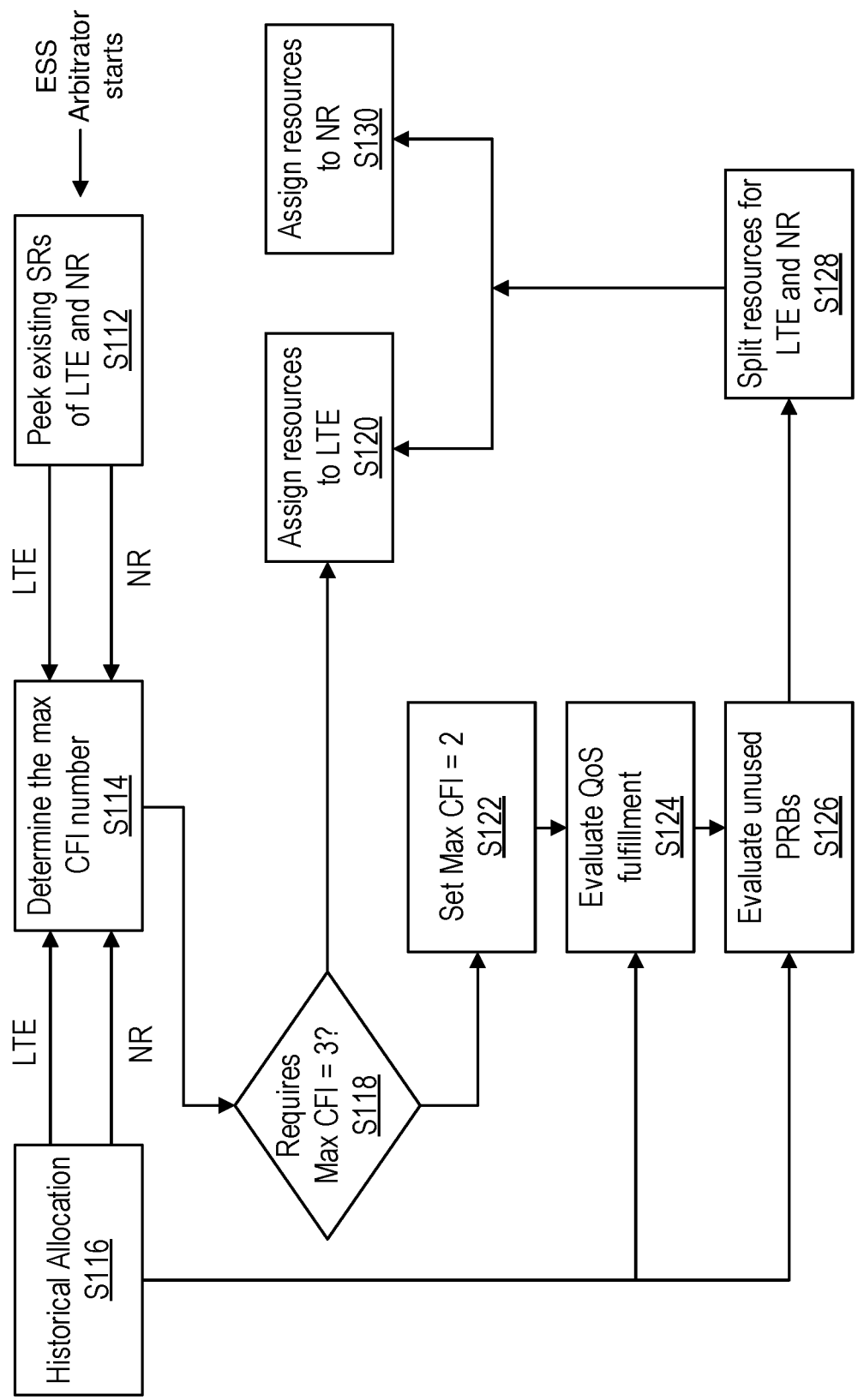
FIG. 9 is an example flowchart of an arbitration process according to some embodiments of the present disclosure.

Based on one or more of the peeked requests and predicted upcoming requests as well as the previous allocation decisions, the controller 24 splits or allocates the spectrum to help satisfy the QoS of high priority requests and then help maximize other network Key Performance Indicators (KPIs), i.e., help improve network performance indicator(s) from at least a first value to a second value, such as spectral efficiency or fairness, among other performance indicators. Splitting or allocating the spectrum may generally refer to allocating part of the spectrum for use by the first RAT (i.e., first RAT scheduler 57 for scheduling to first RAT wireless devices 22) and another part of the spectrum for use by the second RAT (i.e., second RAT scheduler 57 for scheduling to second RAT wireless devices 22), where the entire spectrum is allocated to these RATs or a portion of the spectrum is allocated to these RATs. The controller 24 may send, such a via communication interface 36, a signal to each RAT scheduler 57 on the physical resources (e.g., PRBs or REs) which are allowed to be used for the next x ms. FIG. 9 is a flowchart of another example process of controller 24 according to one or more embodiments of the disclosure. For example, controller 24 such as via processing circuitry 38, processor 40, communication interface 36, arbitration unit 32 is configured to determine (Block S112) peek existing scheduling requests (SRs) of LTE (i.e., a first RAT) and NR (i.e., a second RAT) such as based on information provided by respective RAT schedulers 57. Controller 24, such as via processing circuitry 38, processor 40, communication interface 36, arbitration unit 32 is configured to determine (Block S114) the max Control Format Indicator (CFI) number, as described herein. In one or more embodiments, the determination of Block S114 may be based at least in part on information such as historical allocation information (Block S116) that is described herein. Controller 24 such as via processing circuitry 38, processor 40, communication interface 36, arbitration unit 32 is configured to determine (Block S118) whether max CFI is required, as described herein. Controller 24, such as via processing circuitry 38, processor 40, communication interface 36, arbitration unit 32 is configured to, if max CFI of 3 is required, assign resources to LTE, as described herein (Block S120).

Referring back to Block S118, controller 24, such as via processing circuitry 38, processor 40, communication interface 36, arbitration unit 32, is configured to, if max CFI equal to 3 is not required, set (Block S122) max CFI equals to 2, as described herein. In one or more embodiments, RAT scheduler 57 may set the maximum value to a smaller value according to a local method. Controller 24, such as via processing circuitry 38, processor 40, communication interface 36, arbitration unit 32 is configured to evaluate (Block S124) QoS fulfillment, as described herein. In one or more embodiments, Block S124 may be performed based at least in part on historical allocation information of Block S116, as described herein.

Controller 24, such as via processing circuitry 38, processor 40, communication interface 36, arbitration unit 32, is configured to evaluate (Block S126) unused PRBs, as described herein. In one or more embodiments, Block S126 may be performed based at least in part on historical allocation information of Block S116, as described herein. Controller 24, such as via processing circuitry 38, processor 40, communication interface 36, arbitration unit 32, is configured to split (Block S128) resources for LTE and NR, as described herein. Controller 24, such as via processing circuitry 38, processor 40, communication interface 36, arbitration unit 32, is configured to assign (Block S120 and S130) the split resources to LTE (i.e., LTE scheduler 57) and NR (i.e., NR scheduler 57), as described herein.

4) Scheduling

Given the allocated resources by the controller 24 in Blocks S120 and S130, each RAT scheduler 57 can apply an internal scheduling algorithm (e.g., proportional fair or round robin) among its wireless device requests, thereby, for example, allocating its share of the split resources (i.e., resources committed) to wireless devices 22 serviced by the respective RAT scheduler 57.

5) Learning

In order to help increase one or more of the accuracy, fairness, etc., of the future decisions by controller 24 with respect to allocation of spectrum resources, each RAT scheduler 57 may send, to the controller 24, a scheduling decision such as the number of PRBs used by the RAT/RAT scheduler 57, the number of unscheduled wireless devices 22, the required resources to serve all wireless devices 22, the updated channel conditions in order to improve the future decisions in the arbitration stage and/or improve an QoS-based priority of unsatisfied users associated with wireless devices 22 and corresponding requests. In one or more embodiments, some or all of this information is historical allocation information.

EXAMPLE 1

The first example of the arbitration method of arbitration unit 32 is shown in FIG. 9, which may be based only on the feedback signal, i.e., the computational resources and link capacity may not be included in the peek information.

Step 1 of Example 1: Check LTE CFI Requirement

Figure 10:
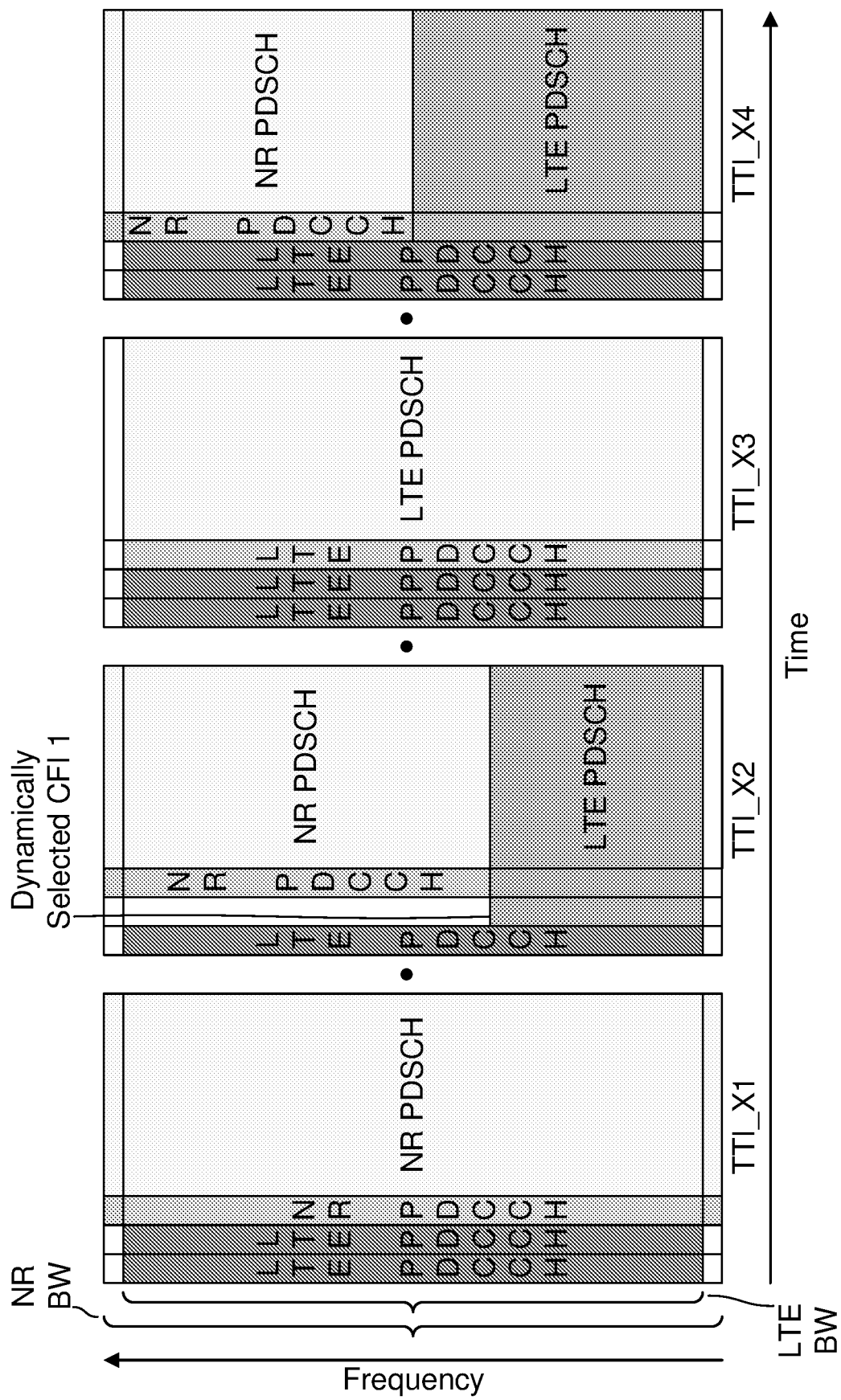
FIG. 10 is an example of downlink (DL) spectrum sharing between LTE and NR with resource element level sharing.

The Control Format Indicator (CFI) requirement of the LTE helps the controller 24 determine such a via processing circuitry 38 and/or arbitration unit 32 whether NR data can be accommodated in the next slot since the NR control channel may not be able to be scheduled if the LTE CFI is set to 3 (in the current Example) as illustrated in FIG. 10. In one or more embodiments, LTE reference symbols may still be sent in the NR PDSCH region. This determination whether NR data can be accommodated may be performed, such as by processing circuitry 38, processor 40, arbitration unit 32, etc., as follows:

```
If ((LTE QoS violated And CCE Util > Control Channel Element (CCE)
threshold) OR CFI prohibit flag== true)
    Set CFI_max = 3
    No NR Allocation in the next TTI
Else
    Set CFI_max = 2
    Go to Step 2
```

Although this example describes the maximum CFI supporting the values of 2 and 3, the embodiments of the present disclosure are not limited to such values and may support other values for the maximum CFI.

A LTE QoS violation can be detected (i.e., set to true), such as by processing circuitry 38 and/or arbitration unit 32, if the queued wireless device 22 requests in the LTE scheduler 57 to have a higher priority than what the NR wireless device 22 requests, and the data channel utilization by LTE is not 100%, which indicates that the control channel capacity may be a communication bottleneck.

Step 2: Check QoS Violation

For unsatisfied scheduling requests tagged as guaranteed bit rate (GBR) with stringent delay and/or minimum bit rate requirements such as those requirements for voice services, the below may be performed, such as by processing circuitry 38, processor 40, arbitration unit 32, etc.:

Calculate the required PRBs and allocate the required PRBs in the next TTI or a number of upcoming TTIs In case of high loaded scenarios (i.e., required PRBs>Total available), the order is: PQ 1 (LTE)→PQ 1 (NR)→PQ 2 (LTE)

Requests belonging to PQ 1 having a higher priority than PQ 2 may be determined by the QCI or 5QI settings as well as the local scheduling algorithm in each RAT scheduler 57. Each RAT scheduler 57 may advertise to the controller 24 which PQ level each request belongs to. Part of the PQ level is the DRX/DTX profile of the wireless devices 22 placing the requests where the requests that belong to wireless devices 22 with short On Duration can have higher priority since their scheduling opportunity is low.

Step 3: Evaluate Unused PRBs and Non-GBR Traffic

Split the remaining PRBs across PQ x (LTE) and PQ x (NR), where PQ x refers to an MBB/BE/non-GBR traffic type Estimate/correct the previous split in a controlled/time averaged manner:

$$\begin{bmatrix} x_t \\ y_t \end{bmatrix} = \omega \begin{bmatrix} x_{t-1} \\ y_{t-1} \end{bmatrix} + (1-\omega) \begin{bmatrix} \bar{x}_t \\ \bar{y}_t \end{bmatrix}$$

$$\begin{bmatrix} x_{t-1} \\ y_{t-1} \end{bmatrix}$$

is the number of assigned (reserved) PRBs for LTE and NR in the previous TTI $$\begin{bmatrix} \bar{x}_t \\ \bar{y}_t \end{bmatrix}$$

is the number of estimated PRBs (satisfied and unsatisfied SRs) based on the latest TTI feedback ω is the weighting/time averaging factor ∈ [0, 1]

The number of PRBs may have to be normalized to the remaining PRBs for non-GBR traffic In case of full buffer (i.e., total number of PRBs>maximum)→split proportional to the estimated number of required PRBs In some embodiments, machine learning techniques such as long short term memory (LSTM) are used to learn the traffic pattern in the wireless device 22 requests and proactively assign the required spectrum for each RAT/RAT scheduler 57.

The number of estimated PRBs for each DL request can be calculated as follows:

---

For each DL request:
- Function: EstimatePrbsPdsch (q, G$_D$)
  - Initialize X: Array [1*N]=false
  - r = getRat(q), i = getUser(q)

Estimate $n_q^{PRB} = \dfrac{B_q}{\bar{n}_{RE}^r \times \overline{ICC}_{RE}^i}$

Round: $n_q^{PRB} := S \times \left\lceil \dfrac{n_q^{PRB}}{S} \right\rceil$

- x = Find first unassigned PRB
  - n$_q^{PRB}$ = min(N − x + 1, n$_q^{PRB}$)
  - if n$_q^{PRB}$ > 0
    - Update global PRB map: G[x: x + n$_q^{PRB}$] = true
    - X[x: x + n$_q^{PRB}$] = true
  - Else
    - X =[ ];
  - End if
Return: X

---

Where:
N: Total number of PRBs
G$_D$: All DL PRBs map
Q: LTE-NR combined sorted requests queue
B$_q$: number of bits for request q
$\bar{n}_{RE}^r$: Average number of Res/PRB if RAT r is used, after excluding the reference or broadcast symbols
$\overline{ICC}_{RE}^i$: Average information carrying capacity (ICC) per resource element (RE) for user i
S: Size of resource block group
M$_r$: Array of allocated PRB indices to RAT r

EXAMPLE 2

Different from Example 1, in Example 2, the peek information is used, such as by processing circuitry 38, processor 40, arbitration unit 32, etc., in determining the resource split as follows:

---

Input: Q
Initialize G$_D$: Array[1, N] = false, M$_r$, ∀ r ∈ {NR, LTE}
for q∈Q AND hasUnAssignedPrbs(G)==TRUE
  If isDL(q) == TRUE
    x$_{PDSCH}$ = EstimatePrbsPdsch (q, G$_D$)
    x$_{PDCCH}$ = EstimatePrbsPdcch (q, G$_D$, x$_{PDSCH}$)
    x$_{PUCCH}$ = EstimatePrbsPucch (q)
    If size(x$_{PDSCH}$)>0 AND size(x$_{PDCCH}$) >0 AND size (x$_{PUCCH}$) >0
      Store x$_{PDSCH}$, x$_{PDCCH}$ and x$_{PDSCH}$ in G$_D$ and M$_r$
    End if
  Else // q is an ulRequest
    x$_{PDCCH}$ = EstimatePrbsPdcch (q)
    x$_{PUSCH}$ = EstimatePrbsPusch (q)
    If size(x$_{PDCCH}$)>0 AND size(x$_{PUSCH}$) >0
      Store x$_{PDCCH}$ and x$_{PUSCH}$ in G$_D$, G$_U$ and M$_r$
    End if
  End if
end f or
return: M$_r$, ∀ r ∈ {NR, LTE}

---

Where:
N: Total number of PRBs
G$_D$: All DL PRBs map
Q: LTE-NR combined sorted requests queue
B$_q$: number of bits for request q
x$_i$: a map containing the estimated PRBs allocation for channel i
M$_r$: Array of allocated PRB indices to RAT r In one or more embodiments, the controller 24 may alternate between FDM and TDM sharing, such as based on network load or one or more network characteristics while fulfilling one or more customer/wireless device 22 requirements. In one or more embodiments, the alternating occurs automatically, such as based on the one or more network characteristics. A process for implementing these one or more embodiments is described below:

---

Initialize: nextRAT = LTE
Procedure:
  nextRAT = UpdateNextRAT(policyMOM, nextRAT)
  IF (nextRAT == LTE)
    Satisfy ESS PQ3 (LTE)
    Update and check remaining PRBs
    Satisfy ESS PQ3 (NR)
  ELSE
    Satisfy ESS PQ3 (NR)
    Update and check remaining PRBs
    Satisfy ESS PQ3 (LTE)
  ENDIF
Function:
  UpdateNextRAT(policyMOM, nextRAT)
  IF (policyMOM == 1) // Fair policy
    IF (nextRAT == LTE)
      nextRAT = NR
    ELSE
      nextRAT = LTE
    ENDIF
  ELSEIF (policyMOM == 2) // LTE is always higher priority
    nextRAT = LTE

```
ELSE
   nextRAT = NR
ENDIF
Return nextRAT
```

This embodiment advantageously allows one or more of the following:
  Allows an operator to prioritize one RAT over the other based on a configuration parameter.
  Allows the spectrum sharing method to alternate between TDM and FDM approach based on the load on both RATs in a round robin fashion or based on any other scheduling configuration.
  Thus, increase the possibility of allocating more control channel resources if one RAT needs the entire band in a specific time slot.
  The LTE can use CFI=3 more often if the subframe is allocated to this RAT.

Figure 11:
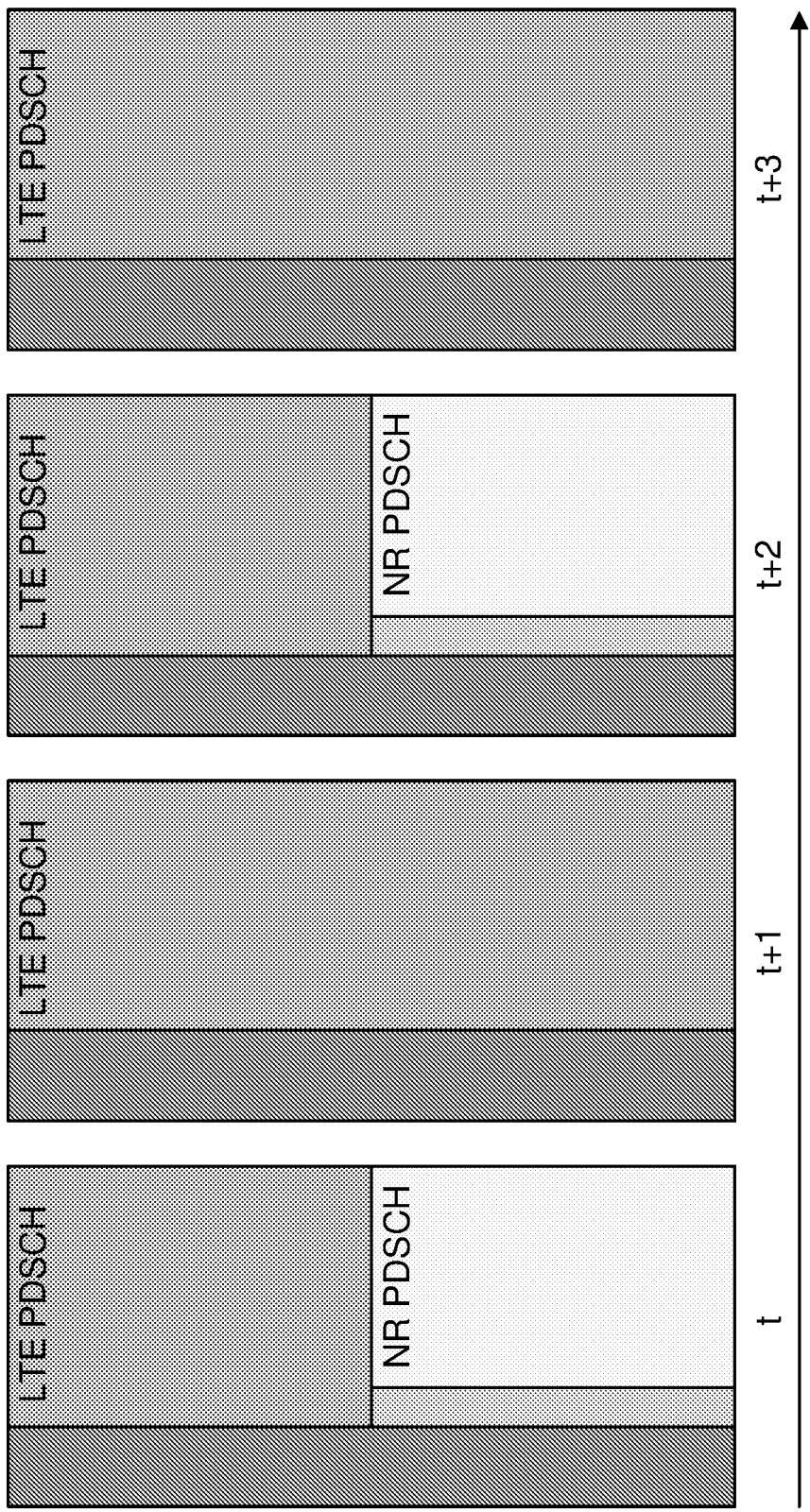
FIG. 11 is a diagram of an example scenario of LTE DL full-buffer and NR DL non-full buffer according to some embodiments of the disclosure.

FIG. 11 is a diagram of an example scenario of LTE DL full-buffer and NR DL non-full buffer according to some embodiments of the disclosure. In FIG. 11, the LTE is full buffer and thus requires the full spectrum, while NR may be running under non-full buffer case, so NR may only require part of the spectrum in each subframe. A method, based on the configuration, can alternate between different splitting methods. FIG. 11 shows one of the splitting methods where round robin used so that LTE is allocated first, and thus there are no remaining PRBs for NR. While in a following subframe, NR is allocated first with a small number or PRBs to satisfy its non-full buffer, and thus LTE can be allocated the rest of the BW. In a different configuration, where NR is prioritized over LTE, non round-robin fashion, then all subframes may have similar allocation as subframe t, while configuration that prioritizes LTE may result in all subframes being similar to t+1. Moreover, if the NR priority jumps to ESS PQ 2 while LTE remained in ESS PQ3, then regardless of the policy configuration, the method may schedule NR in all subframes (i.e., similar to subframe t).

Figure 12:
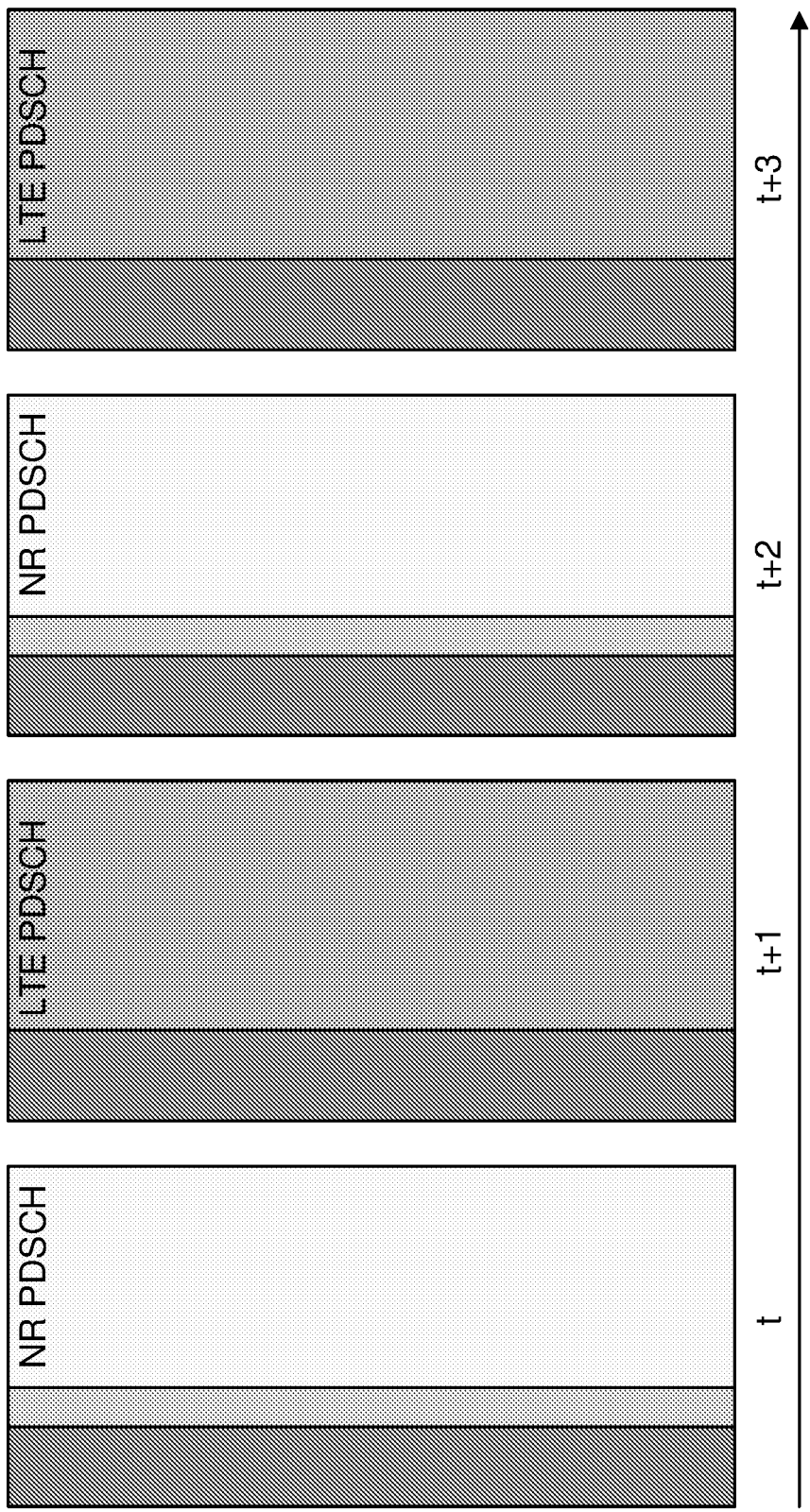
FIG. 12 is a diagram of an example scenario of LTE DL full-buffer and NR DL full-buffer according to some embodiments of the disclosure.

FIG. 12 is a diagram of an example scenario of LTE DL full-buffer and NR DL full-buffer according to some embodiments of the disclosure. In FIG. 12, both RATs are running under full-buffer and thus, using a round-robin policy configuration, a method may automatically result in a TDM-like fashion where the resources are given fully to NR in one subframe and to LTE in another subframe.

In one or more embodiments, the controller 24 (or part of it) can be implemented in a cloud network. In addition, the information, i.e., configuration information, of both schedulers 57 can be transferred to and stored in a remote server residing in the cloud network which can then interact with the controller 24 (residing in the same hardware as the scheduler, or the same cloud network or different cloud network). In one or more embodiments, functionality of controller 24 may be provided by arbitration unit 32 that is located in system 10 such as in network node 16, co-located with network node 16a and/or 16b, etc.

Therefore, in one or more embodiments, the disclosure provides one or more of:
  QoS aware DL spectrum sharing by considering a time dependent priority of wireless device 22 requests and helping ensure that traffic, for instance, with delay budget is prioritized over other best effort traffic.
  Spectrum splitting considers the spectrum requirements for different types of channels (i.e., control channel and data channel) to serve the wireless device 22 request(s).
  Spectrum splitting at a resource element (RE) granularity and exploits the channel awareness and rate matching aspects.
  Spectrum splitting considers a previous allocation to help improve the QoS satisfaction and spectral efficiency in future decisions, i.e., further spectrum splitting decisions.
  Channel conditions and an energy saving profile may be considered while allocating frequency and time resource split for both RATs.

The following is a nonlimiting list of exemplary embodiments of the present disclosure:

Embodiment A1. A network node, comprising processing circuitry that is configured to allocate spectrum resources to a first radio access technology, RAT, scheduler and a second RAT scheduler based on respective information associated with each of the first RAT scheduler and the second RAT scheduler.

Embodiment A2. The network node of Embodiment A1, wherein the allocation of spectrum resources includes allocation of a first OFDM symbol to the first RAT scheduler and a second OFDM symbol to the second RAT scheduler where the first and second OFDM symbols are on a same or different subcarrier and rate matched to each other.

Embodiment A3. The network node of Embodiment A1, wherein the information includes at least one of:
  configuration information associated with at least one of reference signals, broadcast channels, symbol indices of both control and shared channels; and
  peek requests information associated with at least one of wireless device requests in a scheduling queue, priority information, channel conditions and required channel types.

Embodiment A4. The network node of Embodiment A1, wherein the spectrum resources are allocated to satisfy a quality of service of predefined priority requests and to at least improve at least one network performance indicator from a first value to second value.

Embodiment A5. The network node of Embodiment A1, wherein the network node is a first RAT network node; and
  the processing circuitry is further configured to apply a scheduling method based on the allocated resources for the first RAT scheduler for requests received from first RAT wireless devices.

Embodiment A6. The network node of Embodiment A1, wherein the information includes historical user information associated with the first RAT scheduler and second RAT scheduler, the historical user information including at least one of:
  a quantity of use Physical Resource Blocks, PRBs;
  a quantity of unscheduled wireless devices;
  resources required to serve wireless devices;
  updated channel condition information; and
  quality of service (QoS) requirement of packet requests.

Embodiment B1. A method implemented in a network node, the method comprising allocating spectrum resources to a first radio access technology, RAT, scheduler and a second RAT scheduler based on respective information associated with the first RAT scheduler and the second RAT scheduler.

Embodiment B2. The method of Embodiment B1, wherein the allocation of spectrum resources includes allocation of a first OFDM symbol to the first RAT scheduler and a second OFDM symbol to the second RAT scheduler where the first and second OFDM symbols are on a same or different subcarrier and rate matched to each other.

Embodiment B3. The method of Embodiment B1, wherein the information includes at least one of:
- configuration information associated with at least one of reference signals, broadcast channels, symbol indices of both control and shared channels; and
- peek requests information associated with at least one of wireless device requests in a scheduling queue, priority information, channel conditions and required channel types.

Embodiment B4. The method of Embodiment B1, wherein the spectrum resources are allocated to satisfy a quality of service of predefined priority requests and to at least improve at least one network performance indicator from a first value to a second value.

Embodiment B5. The method of Embodiment B1, wherein the network node is a first RAT network node; and further comprising applying a scheduling method based on the allocated resources for the first RAT scheduler for requests received from first RAT wireless devices.

Embodiment B6. The method of Embodiment B1, wherein the information includes historical user information associated with the first RAT scheduler and second RAT scheduler, the historical user information including at least one of:
- a quantity of use Physical Resource Blocks, PRBs;
- a quantity of unscheduled wireless devices;
- resources required to serve wireless devices;
- updated channel condition information; and
- quality of service (QoS) requirement of packet requests.

Embodiment C1. A controller in communication with a first radio access technology, RAT, scheduler of a first RAT network node and a second RAT scheduler of a second RAT network node, the controller including processing circuitry configured to allocate spectrum resources to the first RAT scheduler and the second RAT scheduler based on respective information associated with each of the first RAT scheduler and the second RAT scheduler.

Embodiment C2. The controller of Embodiment C1, wherein the allocation of spectrum resources includes allocation a first OFDM symbol to the first RAT scheduler and a second OFDM symbol to the second RAT scheduler where the first and second OFDM symbols are on a same subcarrier and rate matched to each other.

Embodiment C3. The controller of Embodiment C1, wherein the information includes at least one of:
- configuration information associated with at least one of reference signals, broadcast channels, symbol indices of both control and shared channels; and
- peek requests information associated with at least one of wireless device requests in a scheduling queue, priority information, channel conditions and required channel types.

Embodiment C4. The controller of Embodiment C1, wherein the spectrum resources are allocated to satisfy quality of service of predefined priority requests and to at least improve at least one network performance indicator from a first value to a second value.

Embodiment C5. The controller of Embodiment C1, wherein the information includes historical user information associated with the first RAT scheduler and second RAT scheduler, the historical user information including at least one of:
- a quantity of use Physical Resource Blocks, PRBs;
- a quantity of unscheduled wireless devices;
- resources required to search wireless devices;
- updated channel condition information; and
- quality of service (QoS) requirement of packet requests.

Embodiment D1. A method implemented by a controller in communication with a first radio access technology, RAT, scheduler of a first RAT network node and a second RAT scheduler of a second RAT network node, the method comprising allocating spectrum resources to the first RAT scheduler and the second RAT scheduler based on respective information associated with each of the first RAT scheduler and the second RAT scheduler.

Embodiment D2. The method of Embodiment D1, wherein the allocation of spectrum resources includes allocation a first OFDM symbol to the first RAT scheduler and a second OFDM symbol to the second RAT scheduler where the first and second OFDM symbols are on a same subcarrier and rate matched to each other.

Embodiment D3. The method of Embodiment D1, wherein the information includes at least one of:
- configuration information associated with at least one of reference signals, broadcast channels, symbol indices of both control and shared channels; and
- peek requests information associated with at least one of wireless device requests in a scheduling queue, priority information, channel conditions and required channel types.

Embodiment D4. The method of Embodiment D1, wherein the spectrum resources are allocated to satisfy quality of service of predefined priority requests and to at least improve at least one network performance indicator from a first value to a second value.

Embodiment D5. The method of Embodiment D1, wherein the information includes historical user information associated with the first RAT scheduler and second RAT scheduler, the historical user information including at least one of:
- a quantity of use Physical Resource Blocks, PRBs;
- a quantity of unscheduled wireless devices;
- resources required to search wireless devices;
- updated channel condition information; and
- quality of service (QoS) requirement of packet requests.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a network node to allocate wireless resources among a plurality of radio access technologies, RATs, the plurality of RATs comprising a first RAT and a second RAT, the method comprising:
    determining a quality requirement based at least on a historical wireless resource allocation; and
    allocating wireless resources among the plurality of RATs based at least on the determined quality requirement, the allocation of wireless resources including allocating a first orthogonal frequency division multiplex, OFDM, symbol to the first RAT and allocating a second OFDM symbol to the second RAT.

2. The method of claim 1, further including receiving configuration information associated with the first RAT of the plurality of RATs and configuration information associated with the second RAT of the plurality of RATs.

3. The method of claim 1, wherein the first and second OFDM symbols are on one of a shared subcarrier and different subcarriers.

4. The method of claim 1, further including receiving peek request information associated with one of the first RAT and the second RAT, the peek request information including at least one of a wireless device request in a scheduling queue, wireless device priority information, channel conditions, and a required channel type to serve the wireless device request.

5. The method of claim 4, wherein allocating wireless resources among the plurality of RATs is further based on the received peek request information.

6. The method of claim 1, wherein determining the quality requirement includes determining a maximum control format indicator, CFI, value associated with the first RAT to determine whether the wireless resources to be allocated can include wireless resources associated with the second RAT.

7. The method of claim 6, wherein determining the maximum CFI value of the first RAT includes:
    setting the maximum CFI value to a first predefined value, if a maximum CFI condition is met, the maximum CFI condition including one of:
        an existing violation of quality of service, QoS, associated with the first RAT and a control channel element, CCE, utilization being greater than a CCE threshold; and
        a CFI prohibition is flagged to true; and
    setting the maximum CFI value to a second predefined value, if the maximum CFI condition is not met.

8. The method of claim 7, wherein the existing violation of QoS is determined at least by:
    determining that a first wireless device request in the first RAT has a higher priority than a second wireless device in the second RAT and a data channel utilization by the first RAT is less than 100%.

9. The method of claim 7, wherein allocating wireless resources among the plurality of RATs includes:
    allocating wireless resources associated only with the first RAT when the maximum CFI value equals the first predefined value; and
    allocating wireless resources associated at least with the first RAT and the second RAT when the maximum CFI value equals the second predefined value.

10. The method of claim 9, wherein allocating wireless resources associated at least with the first RAT and the second RAT further includes:
    determining a QoS violation based at least on the historical wireless resource allocation;

determining unused physical resource blocks, PRBs, and a non-guaranteed-bit-rate, GBR, traffic type based at least on the historical wireless resource allocation; and allocating the wireless resources associated at least with the first RAT and the second RAT based at least on one of the determined QoS violation and the determined unused PRBs and non-GBR traffic type.

11. The method of claim 10, wherein determining a QoS violation includes at least:

determining at least a minimum bit rate requirement is unsatisfied.

12. A method for a controller to allocate wireless resources among a plurality of radio access technologies, RATs, the plurality of RATs comprising a first RAT and a second RAT, the method comprising:

determining a quality requirement based at least on a historical wireless resource allocation; and allocating wireless resources among the plurality of RATs based at least on the determined quality requirement, the allocation of wireless resources including allocating a first orthogonal frequency division multiplex, OFDM, symbol to the first RAT and allocating a second OFDM symbol to the second RAT.

13. The method of claim 12, further including receiving configuration information associated with the first RAT from the plurality of RATs and configuration information associated with the second RAT from the plurality of RATs.

14. The method of claim 12, wherein the first and second OFDM symbols are on one of a shared subcarrier and different subcarriers.

15. The method of claim 12, further including receiving peek request information associated with one of the first RAT and the second RAT, the peek request information including at least one of a wireless device request in a scheduling queue, wireless device priority information, channel conditions, and required channel types to serve the wireless device request.

16. The method of claim 15, wherein allocating wireless resources among the plurality of RATs is further based on the received peek request information.

17. The method of claim 12, wherein determining the quality requirement includes determining a maximum control format indicator, CFI, value associated with the first RAT to determine whether the wireless resources to be allocated can include wireless resources associated with the second RAT.

18. The method of claim 17, wherein determining the maximum CFI value of the first RAT includes:

setting the maximum CFI value to a first predefined value, if a maximum CFI condition is met, the maximum CFI condition including one of:

an existing violation of quality of service, QoS, associated with the first RAT and a control channel element, CCE, utilization being greater than a CCE threshold; and a CFI prohibition is flagged to true; and setting the maximum CFI value to a second predefined value, if the maximum CFI condition is not met.

19. The method of claim 18, wherein the existing violation of QoS is determined at least by:

determining that a first wireless device request in the first RAT has a higher priority than a second wireless device in the second RAT and a data channel utilization by the first RAT is less than 100%.

20. The method of claim 18, wherein allocating wireless resources among the plurality of RATs includes:

allocating wireless resources associated only with the first RAT when the maximum CFI value equals the first predefined value; and allocating wireless resources associated at least with the first RAT and the second RAT when the maximum CFI value equals the second predefined value.

21. The method of claim 20, wherein allocating wireless resources associated at least with the first RAT and the second RAT further includes:

determining a QoS violation based at least on the historical wireless resource allocation;

determining unused physical resource blocks, PRBs, and a non-guaranteed-bit-rate, GBR, traffic type based at least on the historical wireless resource allocation; and allocating the wireless resources associated at least with the first RAT and the second RAT based at least on one of the determined QoS violation and the determined unused PRBs and non-GBR traffic type.

22. The method of claim 21, wherein determining a QoS violation includes at least:

determining at least a minimum bit rate requirement is unsatisfied.

* * * * *